United States Patent
Rosenband et al.

(10) Patent No.: US 8,943,265 B2
(45) Date of Patent: Jan. 27, 2015

(54) STORAGE ARRAY CONTROLLER

(71) Applicants: Daniel L Rosenband, Cambridge, MA (US); Michael J Smith, Palo Alto, CA (US)

(72) Inventors: Daniel L Rosenband, Cambridge, MA (US); Michael J Smith, Palo Alto, CA (US)

(*) Notice: Subject to any disclaimer, the term of this patent is extended or adjusted under 35 U.S.C. 154(b) by 0 days.

(21) Appl. No.: 13/894,525

(22) Filed: May 15, 2013

(65) Prior Publication Data

US 2014/0164684 A1    Jun. 12, 2014

Related U.S. Application Data

(63) Continuation of application No. 12/876,393, filed on Sep. 7, 2010, now abandoned.

(51) Int. Cl.
| | |
|---|---|
| G06F 12/00 | (2006.01) |
| G06F 13/00 | (2006.01) |
| G06F 13/28 | (2006.01) |
| G06F 12/02 | (2006.01) |
| G06F 3/06 | (2006.01) |

(52) U.S. Cl.
CPC ............ *G06F 12/0253* (2013.01); *G06F 3/061* (2013.01); *G06F 3/0659* (2013.01); *G06F 3/0688* (2013.01); *G06F 12/0246* (2013.01)
USPC ....................................................... 711/103

(58) Field of Classification Search
CPC ..... G06F 3/061; G06F 3/0659; G06F 3/0688; G06F 12/0253; G06F 12/0246
USPC ....................................................... 711/103
See application file for complete search history.

(56) References Cited

U.S. PATENT DOCUMENTS

| | | | |
|---|---|---|---|
| 4,805,098 A | 2/1989 | Mills et al. | |
| 5,333,143 A | 7/1994 | Blaum et al. | |
| 5,778,426 A | 7/1998 | DeKoning et al. | |
| 5,799,168 A * | 8/1998 | Ban | 711/103 |
| 5,892,978 A | 4/1999 | Munguia et al. | |
| 5,960,169 A * | 9/1999 | Styczinski | 714/6.12 |
| 7,594,023 B2 | 9/2009 | Gemmell | |
| 7,707,354 B2 * | 4/2010 | Lee et al. | 711/103 |
| 7,757,231 B2 * | 7/2010 | Anderson et al. | 718/1 |
| 7,930,499 B2 * | 4/2011 | Duchesne | 711/162 |
| 8,055,938 B1 | 11/2011 | Chatterjee et al. | |
| 8,214,607 B2 | 7/2012 | Williams | |
| 8,275,933 B2 | 9/2012 | Flynn et al. | |
| 2006/0004951 A1 * | 1/2006 | Rudelic et al. | 711/103 |
| 2008/0040553 A1 | 2/2008 | Ash et al. | |
| 2008/0120463 A1 * | 5/2008 | Ashmore | 711/114 |
| 2009/0198885 A1 | 8/2009 | Manoj | |
| 2009/0259800 A1 | 10/2009 | Kilzer et al. | |
| 2009/0327603 A1 | 12/2009 | McKean et al. | |

(Continued)

OTHER PUBLICATIONS

Yoon Jae Seong et al, Hydra: A Block-Mapped Parallel Flash Memory Solid State Disk Architecture, IEEE Transactions on Computer, vol. 59, No. 7, Jul. 2010.*

(Continued)

*Primary Examiner* — Matthew Bradley
*Assistant Examiner* — Rocio Del Mar Perez-Velez

(57) ABSTRACT

A storage array controller provides a method and system for autonomously issuing trim commands to one or more solid-state storage devices in a storage array. The storage array controller is separate from any operating system running on a host system and separate from any controller in the solid-state storage device(s). The trim commands allow the solid-state storage device to operate more efficiently.

20 Claims, 13 Drawing Sheets

(56) References Cited

U.S. PATENT DOCUMENTS

| | | |
|---|---|---|
| 2010/0174853 A1 | 7/2010 | Lee et al. |
| 2010/0235569 A1 | 9/2010 | Nishimoto et al. |
| 2011/0060863 A1 | 3/2011 | Kimura et al. |
| 2011/0093648 A1 | 4/2011 | Belluomini et al. |
| 2011/0145306 A1* | 6/2011 | Boyd et al. ................... 707/824 |
| 2011/0161560 A1* | 6/2011 | Hutchison et al. ............ 711/103 |
| 2011/0276963 A1* | 11/2011 | Wu et al. ........................... 718/1 |
| 2012/0059976 A1 | 3/2012 | Rosenband et al. |
| 2012/0117309 A1* | 5/2012 | Schuette ....................... 711/103 |
| 2012/0151254 A1 | 6/2012 | Horn |

OTHER PUBLICATIONS

Jeong-Uk Kang et al, A Superblock-based Flash Translation Layer for Nand Flash Memory, Oct. 2006.*

Machine Translation for Korean Application KR1020080127633. Applicant INDILINX Co (1-2007-050237-1). Inventor Su-Gil Jeong. Document Date Dec. 16, 2008.*

U.S. Appl. No. 12/983,876 Office Action dated May 22, 2014.

* cited by examiner

STORAGE ARRAY CONTROLLER

CROSS-REFERENCE TO RELATED APPLICATIONS

This application is a continuation of U.S. patent application Ser. No. 12/876,393, filed Sep. 7, 2010, titled "A storage array controller for solid-state storage devices."

If any definitions, information, etc. from any parent or related application and used for claim interpretation or other purpose conflict with this description, then the definitions, information, etc. in this description shall apply.

BACKGROUND OF THE INVENTION

1. Field of the Invention

The present invention relates generally to US Classification 711/216. The present invention relates to storage array controllers and more particularly to storage array controllers for storage arrays that include solid-state storage devices.

2. Description of the Related Art

U.S. Pat. No. 6,480,936 describes a cache control unit for a storage apparatus.

U.S. Pat. No. 7,574,556 and U.S. Pat. No. 7,500,050 describe destaging of writes in a non-volatile cache.

U.S. Pat. No. 7,253,981 describes the re-ordering of writes in a disk controller.

U.S. Pat. No. 6,957,302 describes the use of a write stack drive in combination with a normal drive.

U.S. Pat. No. 5,893,164 describes a method of tracking incomplete writes in a disk array.

U.S. Pat. No. 6,219,289 describes a data writing apparatus for a tester to write data to a plurality of electric devices.

U.S. Pat. No. 7,318,118 describes a disk drive controller that completes some writes to flash memory of a hard disk drive for subsequent de-staging to the disk, whereas for other writes the data is written directly to disk.

U.S. Pat. No. 6,427,184 describes a disk controller that detects a sequential I/O stream from a host computer.

U.S. Pat. No. 7,216,199 describes a storage controller that continuously writes write-requested data to a stripe on a disk without using a write buffer.

US Publication 2008/0307192 describes storage address re-mapping.

BRIEF SUMMARY OF THE INVENTION

The invention includes improvements to a storage array controller for storage arrays that include solid-state storage devices. The improvements include the ability of a storage array controller to autonomously issue disk trim commands to one or more solid-state storage devices.

BRIEF DESCRIPTION OF THE SEVERAL VIEWS OF THE DRAWINGS

So that the features of the present invention can be understood, a more detailed description of the invention, briefly summarized above, may be had by reference to typical embodiments, some of which are illustrated in the accompanying drawings. It is to be noted, however, that the accompanying drawings illustrate only typical embodiments of this invention and are therefore not to be considered limiting of the scope of the invention, for the invention may admit to other equally effective embodiments. The following detailed description makes reference to the accompanying drawings, which are now briefly described.

Figure 1:
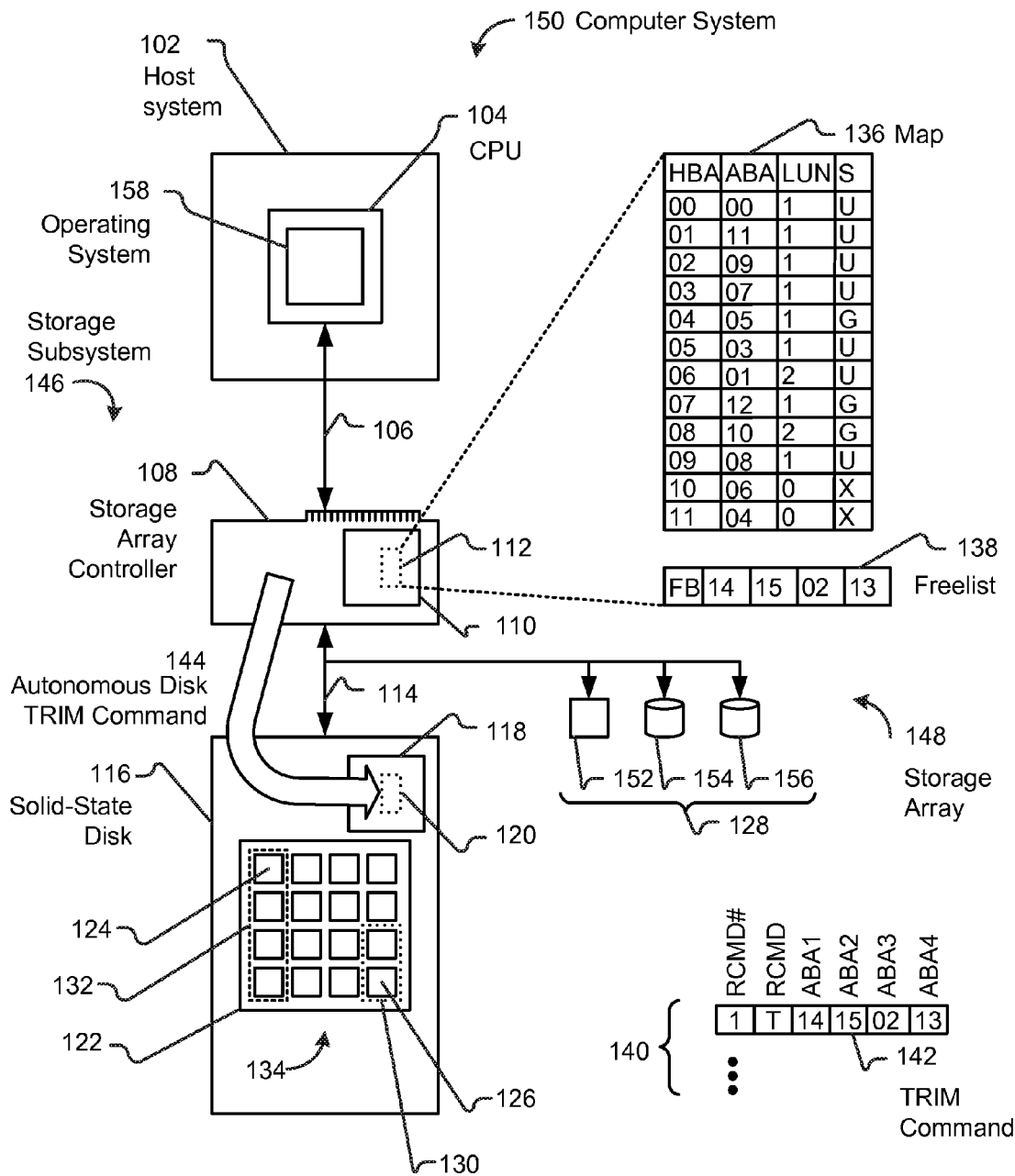
FIG. 1: shows a computer system including storage array controller that issues autonomous disk trim commands.

While the invention is susceptible to various modifications and alternative forms, specific embodiments thereof are shown by way of example in the drawings and will herein be described in detail. It should be understood, however, that the accompanying drawings and detailed description are not intended to limit the invention to the particular form disclosed, but on the contrary, the intention is to cover all modifications, equivalents and alternatives falling within the spirit and scope of the present invention as defined by the accompanying claims.

DETAILED DESCRIPTION OF THE INVENTION

In the following detailed description and in the accompanying drawings, specific terminology and images are used to provide a thorough understanding. In some instances, the terminology and images may imply specific details that are not required to practice all embodiments. Similarly, the embodiments described and illustrated are representative and should not be construed as precise representations, as there are prospective variations on what is disclosed that will be obvious to someone with skill in the art. Thus this disclosure is not limited to the specific embodiments described and shown but embraces all prospective variations that fall within its scope. For brevity, not all steps may be detailed, where such details will be known to someone with skill in the art having benefit of this disclosure.

This invention focuses on storage arrays that include solid-state storage devices. The solid-state storage device will typically be a solid-state disk (SSD) and we will use an SSD in our examples, but the solid-state storage device does not have to be an SSD. An SSD may for example, comprise flash devices, but could also comprise other forms of solid-state memory components or devices (SRAM, DRAM, MRAM, volatile, non-volatile, etc.), a combination of different types of solid-state memory components, or a combination of solid-state memory with other types of storage devices (often called a hybrid disk). Such storage arrays may additionally include hard-disk drives (HD or HDD).

This invention allows a storage array controller to autonomously issue a disk trim command. The disk trim command allows an OS to tell an SSD that the sectors specified in the disk trim command are no longer required and may be deleted. The disk trim command allows an SSD to increase performance by executing housekeeping functions, such as erasing flash blocks, that the SSD could not otherwise execute without the information in the disk trim command. The algorithms of this invention allow a storage array controller to autonomously issue disk trim commands, even though an operating system may not support the trim command. The storage array controller is logically located between the host system and one or more SSDs. An SSD contains its own SSD controller, but a storage array controller may have more resources than an SSD controller. This invention allows a storage array controller to use resources, such as larger memory size, non-volatile memory, etc. as well as unique information (because a storage array controller is higher than the SSD controller in the storage array hierarchy, i.e. further from the storage devices) in order to manage and control a storage array as well as provide information to the SSD controller.

GLOSSARY AND CONVENTIONS

Terms that are special to this field of invention or specific to this invention are defined in this description and the first use (and usually the definition) of such special terms are highlighted in italics for the convenience of the reader. Table 1 shows a glossary for the convenience of the reader. If any information from Table 1 used for claim interpretation or other purpose conflict with the description text, figures or other tables, then the information in the description shall apply.

In this description there are several figures that depict similar structures with similar parts or components. For example several figures show a disk command. Even though disk commands may be similar in several figures, the disk commands are not necessarily identical. Thus, as an example, to avoid confusion a disk command in FIG. 1 may be labeled "Disk Command (1)" and a similar, but not identical, disk command in FIG. 2 is labeled "Disk Command (2)", etc.

TABLE 1

| Glossary of Terms | |
|---|---|
| Array Block Address (ABA) | Combination of D and DBA. |
| Block | A region of a flash memory (also used for Sector). |
| Clean | A flash page that is not dirty. |
| Device Driver | Typically software that is coupled to a controller. |
| Dirty | A flash page that is no longer required (also invalid, obsolete). |
| Disk (D) | Identifies a disk (may be HDD or SSD). |
| Disk Block Size (DBS) | The block or sector size of a physical disk. |
| Disk Command | A command as received by a disk. |
| Disk Controller | The logic on a disk (HDD or SSD), as opposed to Storage Array Controller that is separate from a disk. |
| Disk Logical Block Address (DBA) | The LBA that identifies the sector or block on a disk. |
| Disk Sector | A region of a disk (e.g. 512 bytes). See also Sector. |

TABLE 1-continued

| Glossary of Terms | |
|---|---|
| Disk trim Command | Trim Command received by a disk (see also Trim Command). |
| Field | Part of a data structure. |
| Flash Block | Part of a flash memory chip. Flash blocks contain flash pages. |
| Flash Page | Part of a flash memory chip. |
| Free Block (FB) | A block (e.g. ABA) that is free (unused) and ready for use. |
| Free Superblock (FSB) | A superblock in which all blocks are free (unused) blocks. |
| Freelist | A list of free (i.e. unused) blocks or sectors (e.g. LBAs, ABAs). |
| Garbage (G) | A value in a data structure that indicates a block or sector is ready to be erased. |
| Garbage Collection (GC) | Relocating data to new locations and erasing the old locations. Copying flash pages to new flash blocks and erasing old flash blocks. |
| Granularity | An amount of storage (e.g. 512 bytes). |
| Hard Disk (HD) | A mechanical disk, also Hard Disk Drive (HDD). |
| Host Block Address (HBA) | The LBA used by the host to address a storage array controller. |
| Host Block Size (HBS) | The block or sector size seen by the host. |
| Host Command | The commands as transmitted by the host. |
| Host Trim Command | Trim Command issued by host system (see also Trim Command). |
| Logical Block Address (LBA) | The address of a Logical Block. |
| Logical Blocks | A disk sector as seen by the host. |
| Logical Unit Number (LUN) | Identifies a disk or portion of a disk or portion of a collection of disks. |
| Map | A data structure converting storage addresses from one layer of storage hierarchy to the next one. |
| Operating System (OS) | Software that runs on a CPU in a host system (e.g. Windows or Linux). |
| Physical Block Number (PBN) | An address of a physical region in flash memory where data is stored. |
| Physical Disk Sector | Physical region on a disk where data is stored, typically 512 bytes. |
| Random Writes | Successive writes to random locations. |
| Sector | A region of a disk (e.g. 512 bytes). See also Disk Sector. |
| Sequential Writes | Successive writes to successive locations. |
| Solid-State Disk (SSD) | A disk made (for example) from NAND flash memory. |
| SSD Controller | The disk controller that is part of an SSD (as opposed to a Storage Array Controller). |
| Storage Array | A collection of disks. |
| Storage Array Controller | A controller that sits between OS and disks. |
| Storage Command | A read, write etc. directed to a disk. |
| Storage Controller | Not used to avoid confusion with Storage Array Controller. See Disk Controller. |
| Storage Driver | A layer of software between the file system and disk or other storage device. |
| Superblock (SB) | A collection of blocks (e.g. 64 MB). |
| Trim Command | Tells an SSD which areas may be erased (see also Disk Trim Command). |
| Unmapped (X) | A value in a data structure that indicates a block or sector is not in use by the host system. |
| Used (U) | A value in a data structure that indicates a block or sector contains data. |

Storage Array Controller

FIG. 1 shows an embodiment of a Storage Array Controller 108 for a Storage Array 148 that includes a Solid-State Disk (1) 116. In FIG. 1, Computer System 150 includes a Host System 102 running Operating System 158 and containing a CPU 104 that connects to a Storage Subsystem 146 using an IO Bus 106. In FIG. 1 the Storage Subsystem 146 consists of Storage Array Controller 108 and the Storage Array 148. In FIG. 1 the Storage Array 148 includes a Solid-State Disk (1) 116 and Other Storage Array Devices 128.

In FIG. 1 the Storage Array Controller 108 contains a Storage Array Controller Chip 110. In FIG. 1 the Storage Array Controller Chip 110 contains a Storage Array Controller Logic 112. In FIG. 1 the Storage Array Controller Chip 110 connects to a Storage Bus 114. In FIG. 1 the Storage Bus 114 connects to the Solid-State Disk (1) 116 and Other Storage Array Devices 128. In FIG. 1 the Other Storage Array Devices 128 consist of: Solid-State Disk (2) 152, Hard Disk (1) 154, and Hard Disk (2) 156. In FIG. 1 the Other Storage Array Devices 128 may alternatively consist of any combination of storage devices, but will typically include SSDs and/or HDDs.

In FIG. 1 the Solid-State Disk (1) 116 contains a Solid-State Disk Controller Chip 118 and Flash Memory 122. The Solid-State Disk Controller Chip 118 contains Solid-State Disk Logic 120. In FIG. 1 the Flash Memory 122 comprises a number of Disk Sectors 134. In FIG. 1 there are 16 Disk Sectors 134 numbered 00-15: Disk Sector (00) 124 to Disk Sector (15) 126. In FIG. 1 there are two Disk Sectors 134 in a Flash Page 130 and four Disk Sectors 134 in a Flash Block 132.

Other topologies for Computer System 150 are possible: CPU 104 may connect or be coupled to the IO Bus 106 via a chipset; IO Bus 106 may use a serial point-to-point topology and bus technology (such as PCI Express, InfiniBand, HyperTransport, QPI, etc.), but may also use a parallel and/or multi-drop topology and bus technology (such as PCI, etc.); Storage Bus 114 may use a parallel and/or multi-drop topology and bus technology (such as SCSI, etc.), may use a serial point-to-point topology and bus technology (such as SATA, SAS, FC, USB, Light Peak, etc.), or may use a networked protocol (such as iSCSI, FCoE, etc.); the various bus technologies used may be standard or proprietary; the various bus technologies used may be electrical, optical or wireless etc.; portions of the system may be integrated together in a single chip or integrated package, and/or portions of the system may be in different enclosures etc. Many uses for Computer System 150 are possible: a mass storage system, embedded device, etc. Since solid-state storage is widely used in portable electronic devices, the ideas presented here also apply when Computer System 150 is a cell phone, PDA, tablet, camera, videocamera, portable music player, other portable electronic device, or similar.

An operating system (OS) sees a storage array as a collection of disk sectors or just sectors (and sectors may also be called blocks). An SSD in a storage array may have a capacity of more than 100 Gbytes and contain tens of NAND flash memory chips. A typical 1 Gbit NAND flash memory chip may contain 1024 flash blocks with each flash block containing 64 flash pages and each flash page containing 2 kbytes. The numbers of disk sectors, flash pages and flash blocks in FIG. 1 have been greatly reduced from typical values present in commercial products in order to simplify the description of the Storage Array Controller 108.

Disk sectors may be 512 bytes in length (and typically are in the 2010 timeframe). In FIG. 1, if the Disk Sectors 134 are 512 bytes each, then the Solid-State Disk (1) 116 has 16 Disk Sectors 134 (and thus a capacity of only 8 kbytes); with each Flash Block 132 containing only 2 kbytes and each Flash Page 130 containing only 1 kbytes. Thus the example Solid-State Disk (1) 116 of FIG. 1 is several thousand times smaller than available in the 2010 timeframe. The algorithms described here are independent of the absolute and relative sizes of the disk sectors, flash blocks and flash pages.

Note that FIG. 1 is simplified in other aspects also. For example, there may be more than one CPU 104 and more than one IO Bus 106 in the Computer System 150. The storage array configuration may be different than shown in FIG. 1. For example, the Other Storage Array Devices 128 may include hard-disk drives, solid-state disk drives, other storage devices such as storage cards, keys, etc. or other forms of storage media such as optical devices, mechanical devices, etc. There may be more than one Solid-State Disk (1) 116 in the Storage Array 148. In FIG. 1 the Disk Sectors 134 are simplified and shown as if they were separate components, but typically solid-state disks consist of many NAND flash chips and components each of which contain many (millions) disk sectors or flash blocks. Solid-State Disk (1) 116 may be in a form-factor that is a drop-in replacement for a hard-disk (3.5", 2.5" form factors, etc.) or may be in any other form-factor or with any interface (Compact Flash CF, MultiMediaCard MMC, miniSD, Memory Stick, SmartMedia, TransFlash, Secure Digital SD, PCI Express Card, etc.)

We now explain the algorithms of the Storage Array Controller 108.

Algorithm 1: A Storage Array Controller that Issues a Trim Command

FIG. 1 shows details of the Storage Array Controller Logic 112 in the Storage Array Controller 108. The Storage Array Controller Logic 112 includes two data structures: a Map (1) 136 and a Freelist (1) 138. The map contains fields: HBA, ABA, LUN, S. The freelist contains a list of free block ABAs (FB). First, these fields will be described along with other data that may be used by the Storage Array Controller Logic 112, but that is not shown in FIG. 1 for clarity. The map and freelist data structures will then be described in detail.

The sectors or blocks of a storage device are addressed as logical blocks using a logical block address (LBA). To avoid confusion, we will use host block address (HBA) for the LBA used to address a storage array controller. Unless we explicitly state otherwise, we assume that the host block size (HBS) is equal to the disk block size (DBS). The HBA may be a composite or union of a logical unit number (LUN) that identifies a logical portion of the storage array or disk or other device in the storage array; an LBA; the virtual machine (VM), if any; a UserID that identifies the user application; a VolumeID that identifies a logical target volume; and other data that may be used for logical access or management purposes. Note that to simplify the description, clarify the figures, and in particular to make it clear that operations may be performed on different LUNs, the LUN may be shown separately from HBA in FIG. 1 and in other figures. A disk number (D) identifies a disk or other storage device in the storage array. A disk logical block address (DBA) is the LBA that identifies the disk sector on the disk or other storage device. An array block address (ABA) is a composite or union of D and DBA, written <D, DBA>. Note that the storage array does not have to be a RAID array, JBOD, or any other particular type of storage array, but can be. The status field (S) holds the status of the disk sector corresponding to the HBA. Field S uses codes for used (U); unmapped (X); and garbage (G), i.e. ready for garbage collection. We will describe the terms garbage and garbage collection in detail shortly. Field S may use other codes, or other functions for the codes, but for clarity no other codes are shown in FIG. 1. The free blocks (FB) in Freelist (1) 138 are ABAs that are free for use.

A disk controller for an HDD or SSD maintains the relationship between an ABA (or the DBA portion of the ABA) and the disk sectors that are physically part of a storage device (often called the physical disk sectors or physical sectors). In exactly the same way the Solid-State Disk Logic 120 maintains the relationship between an ABA and the physical block number (PBN) of an SSD. The PBN of an SSD is analogous to the physical disk sector of an HDD. Due to resource constraints SSDs often manage the PBNs at a coarser granularity than disk sectors. Normally a disk command contains an LBA provided by the host, but in the presence of a storage array controller the disk command contains an ABA provided by the storage array controller. Note that in FIG. 1 there are 16 Disk Sectors 134 numbered from Disk Sector (00) 124 to Disk Sector (15) 126 on the Solid-State Disk (1) 116. There are 16 ABAs that correspond to these 16 disk sectors, but the Solid-State Disk Logic 120 continuously changes the relationship between the ABAs and the disk sectors. In the example of FIG. 1, 12 of the 16 possible HBAs are in Map (1) 136 and four HBAs (02, 13, 14, 15) are on the Freelist (1) 138.

Because the terms just described can be confusing we summarize the above again briefly. With just a single disk, the host provides an LBA directly to the disk; the disk controller converts the LBA to the physical disk sector (for an HDD) or to the PBN (for an SSD). In the presence of a storage array controller the host still provides an LBA, but now to the storage array controller (and thus we call the LBA an HBA to avoid confusion); the storage array controller then maps this HBA to an ABA and provides the ABA (or possibly just the DBA portion of the ABA) to the disk; the disk (HDD or SSD) then converts this DBA or ABA (treating the DBA portion of the ABA as though it were just an LBA, which it is) to a physical disk address: either the physical disk sector (for an HDD) or PBN (for an SSD).

It is important to understand the additional layer of hierarchy that a storage array controller introduces. The storage hierarchy of FIG. 1 has the following layers: (i) Operating System 158; (ii) Storage Array Controller 108; (iii) Storage Array 148. In FIG. 1 the Storage Array Controller 108 has a higher position in the hierarchy than Solid-State Disk (1) 116, i.e. is further from the storage devices. In FIG. 1 the Storage Array Controller 108 adds a level of indirection (i.e. adds a map or re-map of data) between Host System 102 and Storage Array 148. In FIG. 1 the Storage Array Controller 108 may also add additional resources over and above that of Solid-State Disk (1) 116.

We will define structures and their functions, operations and algorithms in terms of software operations, code and pseudo-code, it should be noted that the algorithms may be performed in hardware; software; firmware; microcode; a combination of hardware, software, firmware or microcode; or in any other manner that performs the same function and/or has the same effect. The data structures, or parts of them, may be stored in the storage array controller in SRAM, DRAM, embedded flash, or other memory. The data structures, or parts of them, may also be stored outside the storage array controller, for example on any of the storage devices of a storage array (the local storage or remote storage, i.e. remote from the storage array connected to the storage array controller) or on a host system (the local host or a remote host, i.e. remote from the host connected to the storage array controller). For example, FIG. 1 shows the Storage Array Controller 108 containing a Storage Array Controller Chip 110 and the Storage Array Controller Logic 112. Alternative implementations are possible: (i) the Storage Array Controller Logic 112 may be completely in hardware, completely in software, or partly hardware and partly software, and may be in any location, on the host or remote, for example (ii) the Storage Array Controller Logic 112 may not physically be in the Storage Array Controller Chip 110 or in the Storage Array Controller 108 (iii) the Storage Array Controller Chip 110 may be implemented as a chip, an ASIC, an FPGA or equivalent, a combination of such components, or may be a combination of hardware and software; (iv) the Storage Array Controller Chip 110 may be a portion (or portions) of a larger chipset, IO controller, processor, etc. A part of this invention is the logical placement of the storage array controller functions and algorithms between operating system and a storage array.

We will now define the data structures (including the map and the freelist) that we will use. A map hr_map is defined between the HBAs and ABAs as hr_map[hba]→aba. Thus hr_map takes an HBA as input and returns an ABA. We say that the HBA maps to that ABA (we can also say that the storage array controller maps or re-maps data from the operating system). A special symbol or bit (for example, we have used X in the Map (1) 136 of FIG. 1) may indicate that an entry in hr_map[hba] is unmapped, and/or we can use a special table entry (for example, we have used a LUN of zero in the Map (1) 136 of FIG. 1) to indicate an entry in hr_map [hba] is unmapped. The Freelist (1) 138 uses a structure aba_free. Note that Map (1) 136 in FIG. 1 is used to map from HBA to ABA for every host command that addresses a storage device: reads, writes, etc. This is true for all of the maps in the examples described here.

We have used the term storage array controller throughout this description rather than storage controller or disk controller. In FIG. 1 the Storage Array Controller 108 is separate from any disk controllers that are part of the storage devices that form the Storage Array 148. As shown in FIG. 1, the Storage Array Controller 108, the Storage Array Controller Chip 110, and the Storage Array Controller Logic 112 are all separate from the Solid-State Disk Controller Chip 118 and Solid-State Disk Logic 120 typically used by the Solid-State Disk (1) 116.

A storage command is directed to a storage device and specifies an operation, such as read, write, etc. A storage command is more commonly called a disk command or just command, a term we will avoid using in isolation to avoid confusion. To avoid such confusion we will use storage command when we are talking about commands in general; but we will save disk command (or disk write, etc.) for the command as it arrives at (or is received by) the disk (either SSD or HDD, usually via a standard interface or storage bus, such as SATA); we will use the term host command (or host write, etc.) for the command as it leaves (or is transmitted by) the OS. A disk command may be the same as a host command when there is a direct connection between the OS on a host system and a single disk.

The algorithms and operations described below use a disk trim command (trim command or just trim are also commonly used). A disk trim command was proposed to the disk drive industry in the 2007 timeframe and introduced in the 2009 timeframe. One such disk trim command is a standard storage command, part of the ATA interface standard, and is intended for use with an SSD. A disk trim command is issued to the SSD; the disk trim command specifies a number of disk sectors on the SSD using data ranges and LBAs (or, as we have explained already, using ABAs or the DBAs contained in ABAs in the presence of a storage array controller); and the disk trim command is directed to the specified disk sectors. The disk trim command allows an OS to tell an SSD that the disk sectors specified in the trim command are no longer required and may be deleted or erased. The disk trim command allows the SSD to increase performance by executing housekeeping functions, such as erasing flash blocks, that the SSD could not otherwise execute without the information in the disk trim command.

It should be noted from the above explanation and our earlier discussion of ABAs that, for example, when we say "place an ABA in a disk trim command," the disk trim command may actually require an LBA (if it is a standard ATA command for example), and that LBA is the DBA portion of the ABA. To simplify the description we may thus refer to an LBA, DBA and ABA as referring to the same block address, and thus mean the same thing, at the disk level.

Although the disk trim command and other storage commands have fixed and well-specified formats, in practice they may be complicated with many long fields and complex appearance. Storage commands may also vary in format depending on the type of storage bus, for example. We will simplify storage commands and other commands in the figures in order to simplify the description (and the format of the storage commands may also vary between different figures and different examples). The algorithms described here are intended to work with any standard or proprietary command set even though a command shown in a figure in this description may not exactly follow any one standard format, for example.

We now describe Algorithm 1 that allows the Storage Array Controller 108 of FIG. 1, rather than Operating System 158, to autonomously issue a disk trim command that is directed to unused disk sectors on the Solid-State Disk (1) 116. In FIG. 1 we have used a large arrow to depict and show the flow of an Autonomous Disk Trim Command 144 between Storage Array Controller 108 and Solid-State Disk (1) 116 (and will use this same depiction in other figures).

We say the Storage Array Controller 108 autonomously issues the disk trim command or issues the disk trim command in an autonomous fashion or in an autonomous manner, or issues autonomous disk trim commands. We use the term autonomous or autonomously here to describe the fact that it is the Storage Array Controller 108 that initiates, originates, or instigates the disk trim command and generates or creates the contents of all (or part) of the disk trim command rather than, for example, Operating System 158 on Host System 102.

Algorithm 1 may be used in a situation where Operating System 158 on Host System 102 does not support the disk trim command (or does not support the disk trim operation). Algorithm 1 may also be used in a situation where Operating System 158 on Host System 102 is unaware of the physical details of the Storage Array 148. Algorithm 1 may be used, for example, in the situation where the sum capacity of the LUNs presented to Operating System 158 on Host System 102 is smaller than the sum capacity of the Storage Array 148. This situation may occur, as an example, because an OS is in a virtual machine and the storage array is being shared by multiple virtual machines. There are, however, many reasons, including the use of storage management; use of a Guest OS, virtualization of machines; remote, NAS and SAN storage arrays; storage virtualization; and other datacenter functions that may cause Operating System 158 on Host System 102 to be unable to, or unaware that it can, issue a disk trim command to a Solid-State Disk (1) 116 in the attached Storage Array 148.

Algorithm 1: trim_aba
Step 1. Assume valid HBAs map to a fixed subset of ABAs in hr_map
Step 2. Issue a disk trim command to ABAs in aba_free that are not mapped to by valid HBAs In FIG. 1 the Freelist (1) 138 in the Storage Array Controller Logic 112 contains ABAs 02, 13, 14, and 15 in aba_free (and these ABAs are therefore not present in Map (1) 136). The Storage Array Controller 108 may use Algorithm 1 to autonomously issue a disk trim command to Solid-State Disk (1) 116 as shown in FIG. 1 by Disk Commands (1) 140. The Disk Trim Command (1) 142 contains: RCMD#, the command number; RCMD, the command (T for trim); and four ABA data range fields (ABA1-ABA4) specifying the ABAs 02, 13, 14, 15. The information in Disk Trim Command (1) 142 may then be used by Solid-State Disk (1) 116.

Note that Disk Trim Command (1) 142 shows the same information content that an industry-standard disk trim command contains; but, is not necessarily in the exact format used, for example, by the ATA industry standard.

Note that alternative implementations for Algorithm 1 may include the following: (i) multiple disk trim commands may be combined; (ii) if Operating System 158 in FIG. 1 supports a trim command, then one or more host trim commands from the Host System 102 may be combined or merged with one or more trim commands autonomously generated by Storage Array Controller 108 to form the disk trim command(s) (we are careful to distinguish host trim commands, which are from the host, from disk trim commands that are received by the disk); (iii) the map hr_map may be compressed or condensed by mapping regions larger than a disk sector (e.g. a LUN); (iv) the map hr_map may be compressed or condensed by using groups or collections of ABAs rather than individual ABAs; (v) any of the alternative implementations of the other algorithms in this description.

One feature of Algorithm 1 is for a storage array controller to set aside, as unused, a portion (or portions) of an SSD (or SSDs) in a storage array. Thus the sum of the LUNs presented to the host system is smaller than the capacity of the storage array. The storage array controller may then autonomously issue disk trim command(s) to the unused portion(s) of an SSD (or SSDs). An SSD may then use the information in the disk trim command to erase or delete flash blocks. The ability to erase or delete flash blocks improves the SSD performance and improves the SSD reliability.

It is important to note that the Storage Array Controller Logic 112 is (i) separate from the Solid-State Disk Logic 120 typically used by the Solid-State Disk Controller Chip 118 and (ii) separate from Operating System 158.

A storage array controller performs certain functions instead of (or in addition to) an OS running on a host system; and a storage array controller also performs certain functions instead of (or in addition to) an SSD controller(s) in a storage array. A storage array controller is logically located between a host system and an SSD. An SSD contains its own SSD controller, but a storage array controller may have more resources than an SSD controller. The algorithms described here allow a storage array controller to use resources, such as larger memory size, non-volatile memory, etc. as well as unique information (because a storage array controller is higher than an SSD controller in a storage array hierarchy, i.e. further from the storage devices) in order to manage and control a storage array as well as provide information to an SSD controller. For example, a storage array controller is aware of LUNs but a SSD controller is not. This hierarchical management approach has other advantages and potential uses that are explained throughout this description in the forms of various algorithms that may be employed by themselves or in combination.

Algorithm 1 illustrates the operation of the Storage Array Controller Logic 112 in the Storage Array Controller 108. The description of Algorithm 1 is useful before we describe more complex algorithms that include host write commands and other storage array functions. These more complex algorithms show how Freelist (1) 138 in FIG. 1 is generated and how Map (1) 136 is changed. Before we discuss these other algorithms we will describe alternative implementations of Algorithm 1.

Alternative Implementations and Structures

Figure 2A:
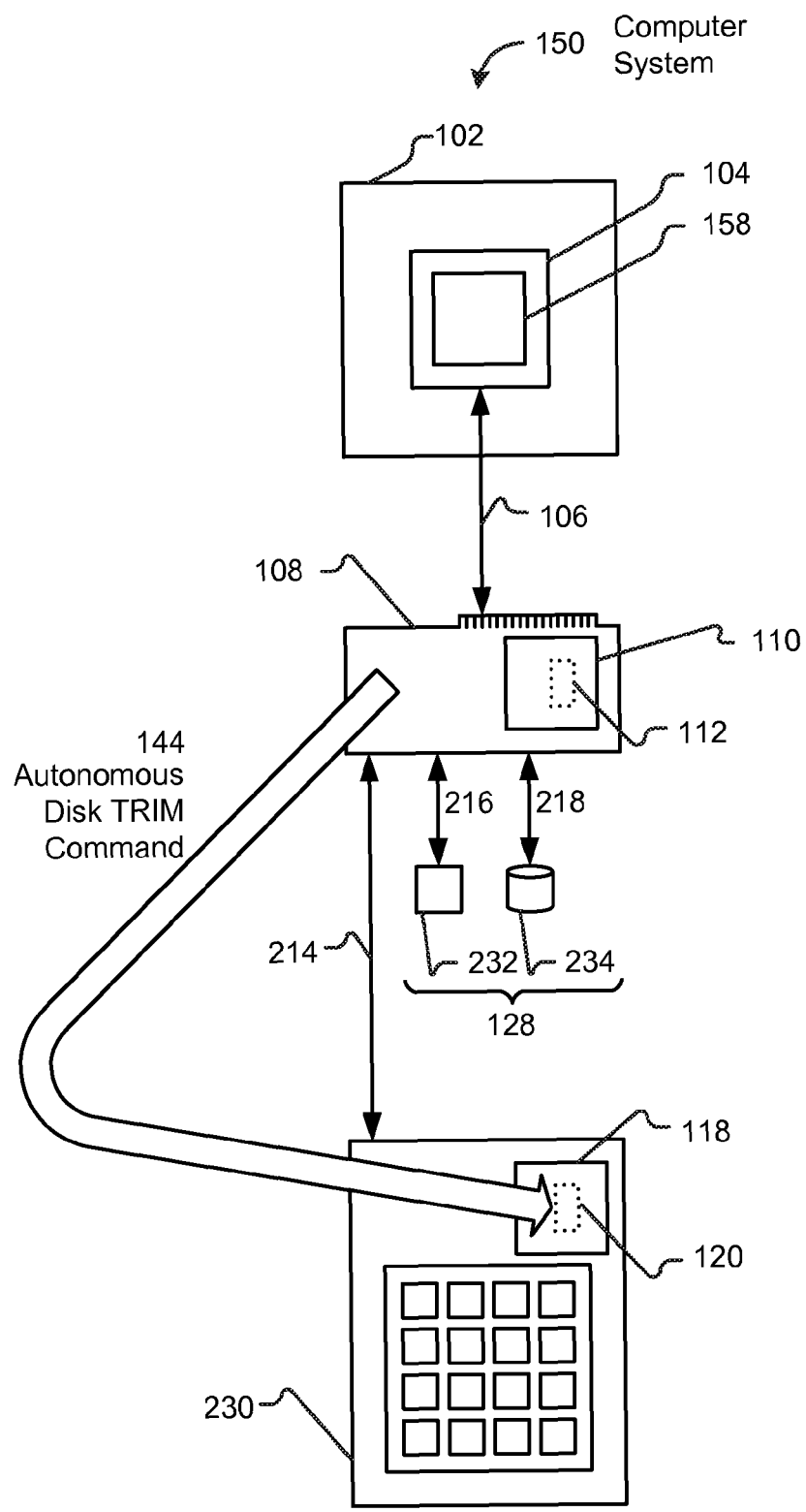
FIG. 2A shows a computer system with a storage array containing two SSDs.
Figure 2:
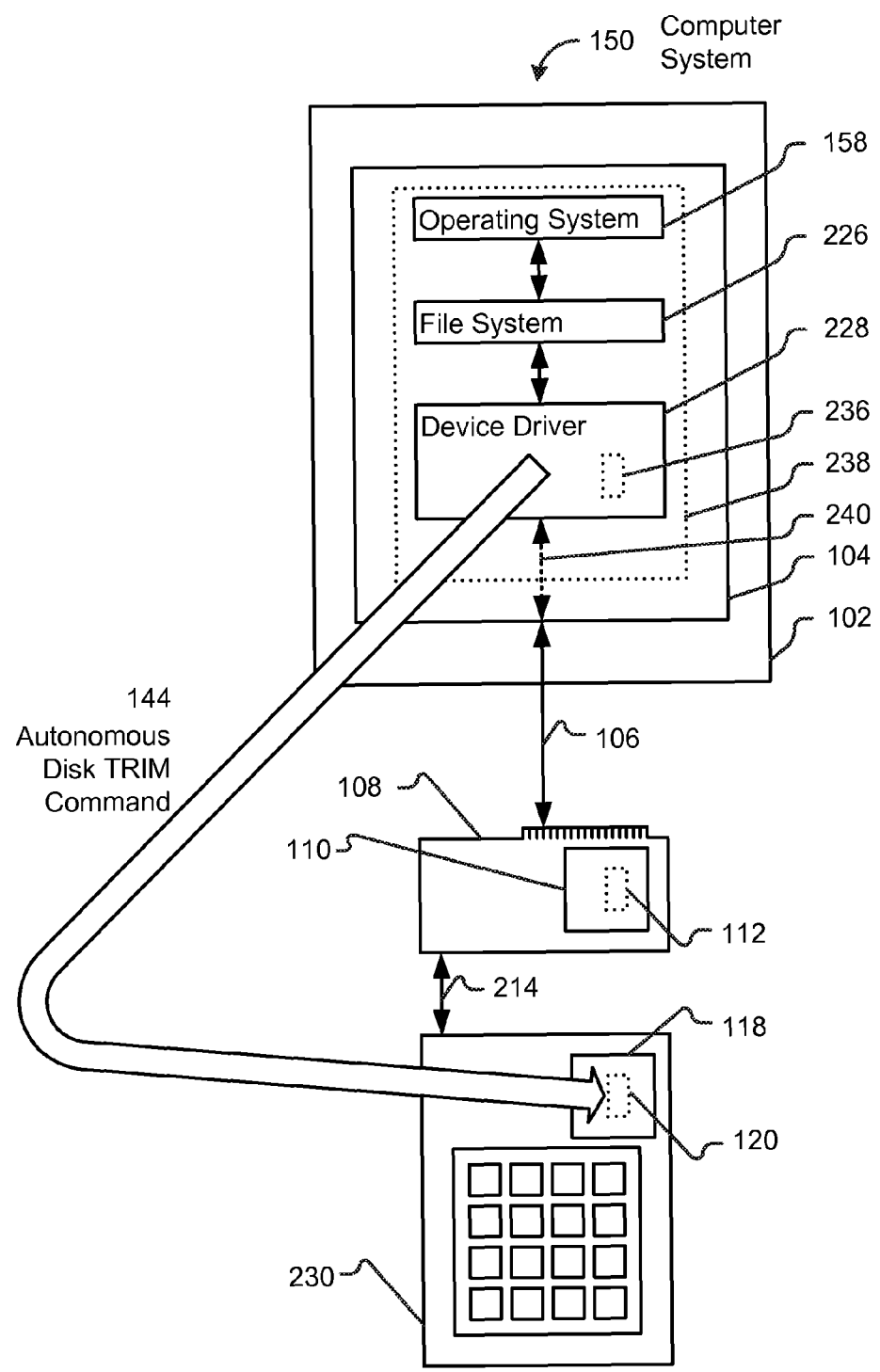
FIG. 2B shows a device driver that issues autonomous disk trim commands.
FIG. 2C shows a device driver that is part of a hypervisor and that issues autonomous disk trim commands.
FIG. 2D shows a hyperdriver that is part of a hypervisor in a Windows Virtualization architecture and that issues autonomous disk trim commands.
FIG. 2E shows a hyperdriver that is part of a hypervisor in a Windows Hyper-V architecture and that issues autonomous disk trim commands.
FIG. 2F shows a hyperdriver as part of a VMWare ESX architecture and that issues autonomous disk trim commands
Figure 2C:
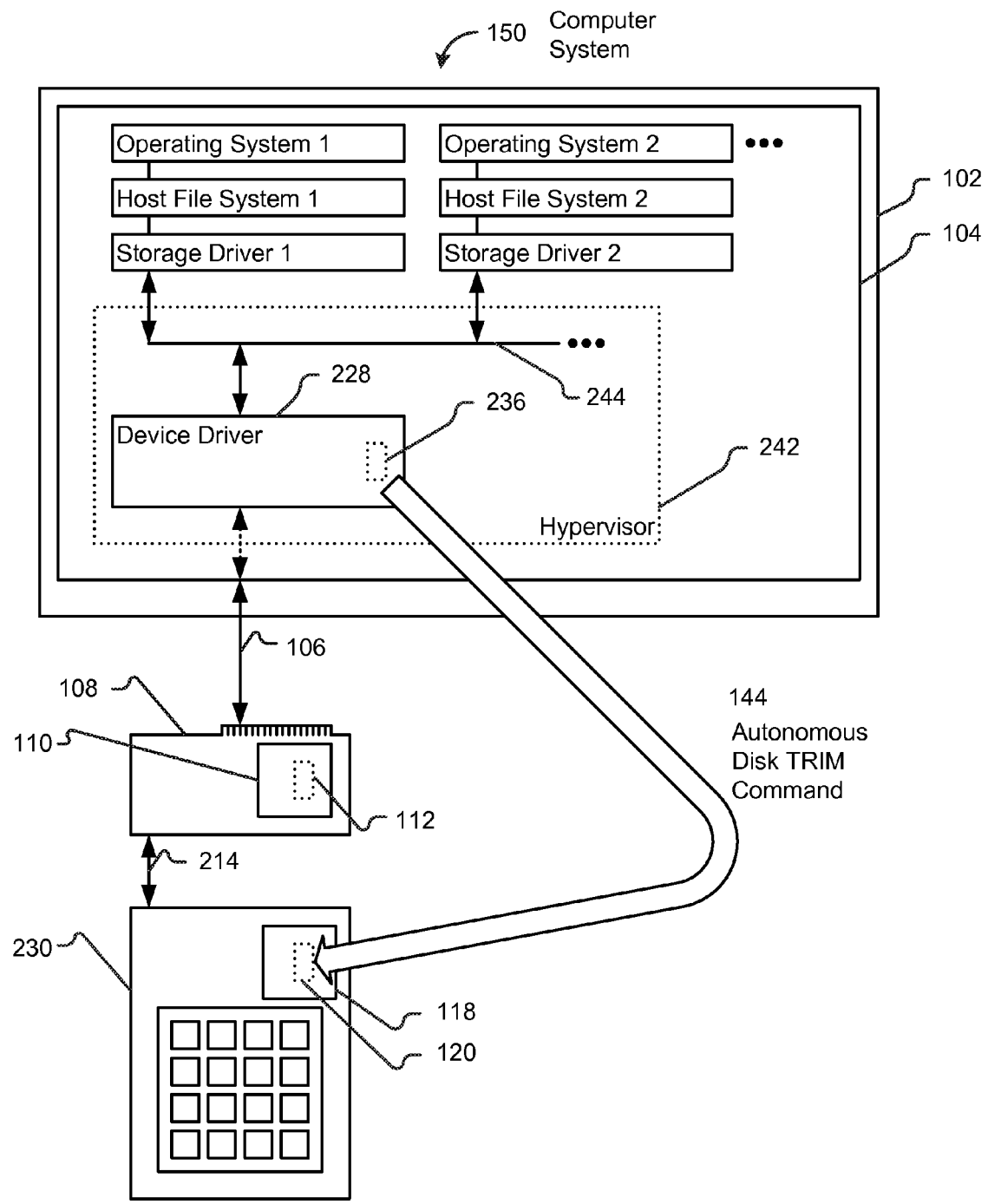

FIGS. 2A-2C show alternative implementations and alternative structures with reference to Algorithm 1.

FIG. 2A shows a serial storage bus. The main elements of FIG. 2A are similar to those of FIG. 1. In FIG. 2A we have shown the Serial Storage Bus (1) 214 as a serial point-to-point bus (in contrast to the parallel multi-drop bus of FIG. 1). In FIG. 2A Solid-State Disk (3) 230 has a serial interface to a Serial Storage Bus (1) 214 (and thus we have given it a different label than in FIG. 1 where Solid-State Disk (1) 116 had a different, parallel, interface). In FIG. 2A Other Storage Array Devices 128 are linked to the Storage Array Controller Logic 112 by Serial Storage Bus (2) 216 and Serial Storage Bus (3) 218. In FIG. 2A the Other Storage Array Devices 128 consist of: Solid-State Disk (4) 232 and Hard Disk (3) 234. In FIG. 2A Error! Not a valid link. issues an Autonomous Disk Trim Command 144 as described previously with reference to FIG. 1.

Note that the various storage-array configuration alternatives as well as other various possibilities for the storage array configuration(s), storage bus(es), and various storage device(s) will not necessarily be shown in all of the figures in order to simplify the description.

FIG. 2B shows a device driver. A device driver is typically (though not necessarily) software that may be (but not necessarily) manufactured with and sold with a storage array controller. (In different implementations the device driver may be implemented in software, hardware, firmware or a combination; and may be designed, manufactured and/or sold separately.) The main elements of FIG. 2B are similar to those of FIG. 1. FIG. 2B does not show other storage devices in a storage array, but they could be present as was shown in FIG. 2A. In FIG. 2B Computer System 150 includes Host System 102 containing a CPU 104 that runs Software 238. In FIG. 2B Software 238 includes: Operating System 158, File System 226 and Device Driver 228. In FIG. 2B Device Driver 228 is connected to IO Bus 106 via Software Bus 240 (shown as dashed to represent the fact that the software-to-hardware connection is a logical connection or coupling and not a direct electrical connection). In FIG. 2B Device Driver 228 includes Device Driver Logic 236. In FIG. 2B the Device Driver 228 is separate from Operating System 158. In FIG. 2B the Device Driver 228 is logically connected or coupled to Storage Array Controller 108. In FIG. 2B Device Driver Logic 236 is logically part of part of Storage Array Controller Logic 112. In FIG. 2B Device Driver Logic 236, logically connected or coupled to Storage Array Controller Logic 112, issues the Autonomous Disk Trim Command 144.

FIG. 2C shows a computer system with multiple virtual machines (VMs), each VM containing an operating system, and a hypervisor. FIG. 2C does not show other storage devices in a storage array, but they could be present. In FIG. 2C there are two operating systems (or more than two, as shown figuratively by the dots) running as VMs in CPU 104: Operating System 1 may be a Host OS and Operating System 2 may be a Guest OS, for example. In FIG. 2C each operating system has a file system and a storage driver (and possibly more than one storage driver). The file system (sometimes considered part of an OS) translates or converts from file-based access (in terms of directories, file names and offsets) to disk-based access (in terms of LBAs). The storage driver (sometimes considered part of an OS) is responsible for handling a disk or other storage device. The storage driver is usually (but not always) separate and distinct from Device Driver 228. In FIG. 2C Device Driver 228 is part of Hypervisor 242 and logically connected or coupled to storage drivers through Software Bus (2) 244. In FIG. 2C Device Driver 228 contains Device Driver Logic 236. In FIG. 2C Device Driver Logic 236, logically connected or coupled to Storage Array Controller Logic 112, issues the Autonomous Disk Trim Command 144.

Figure 2D:
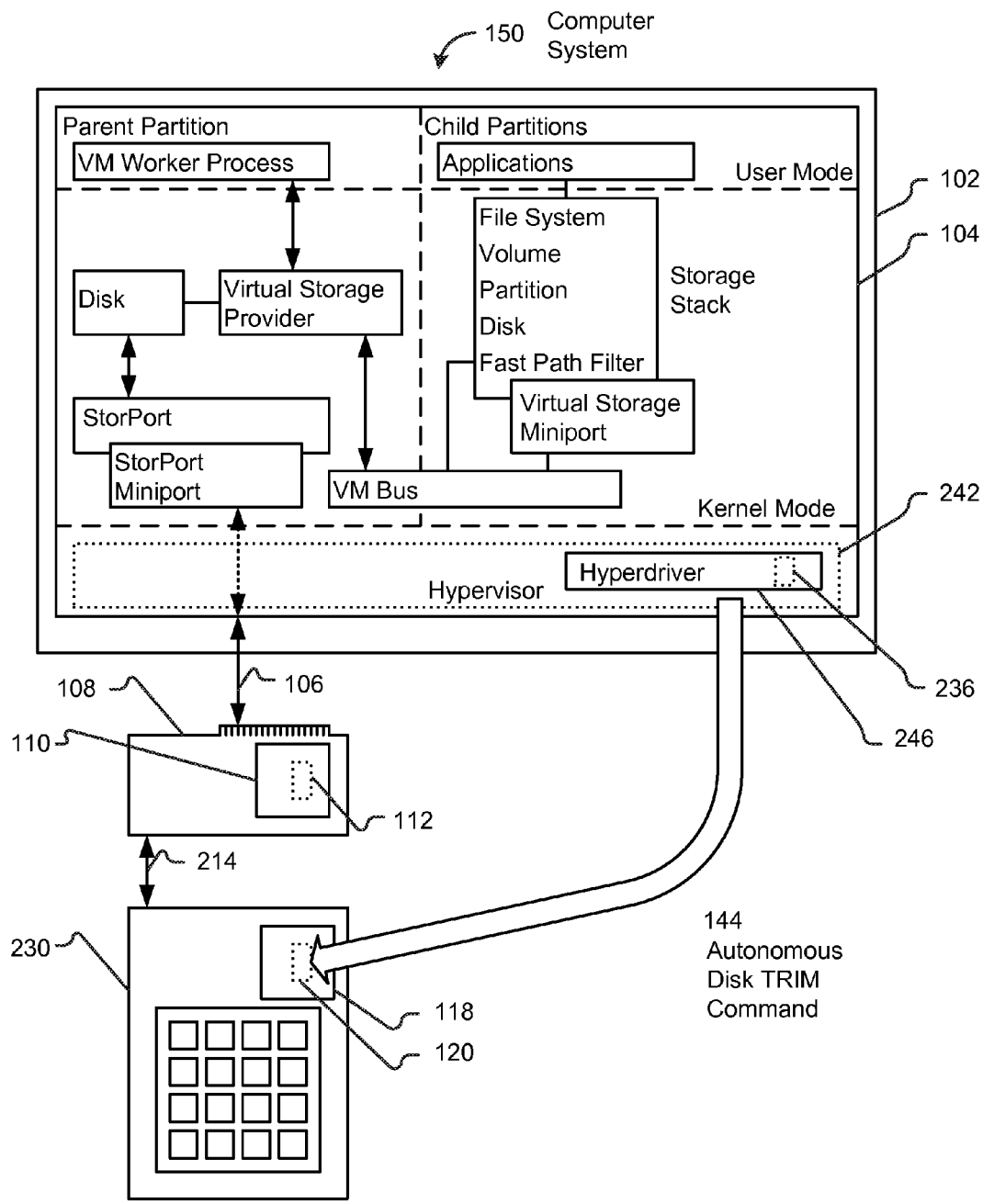
Figure 2:
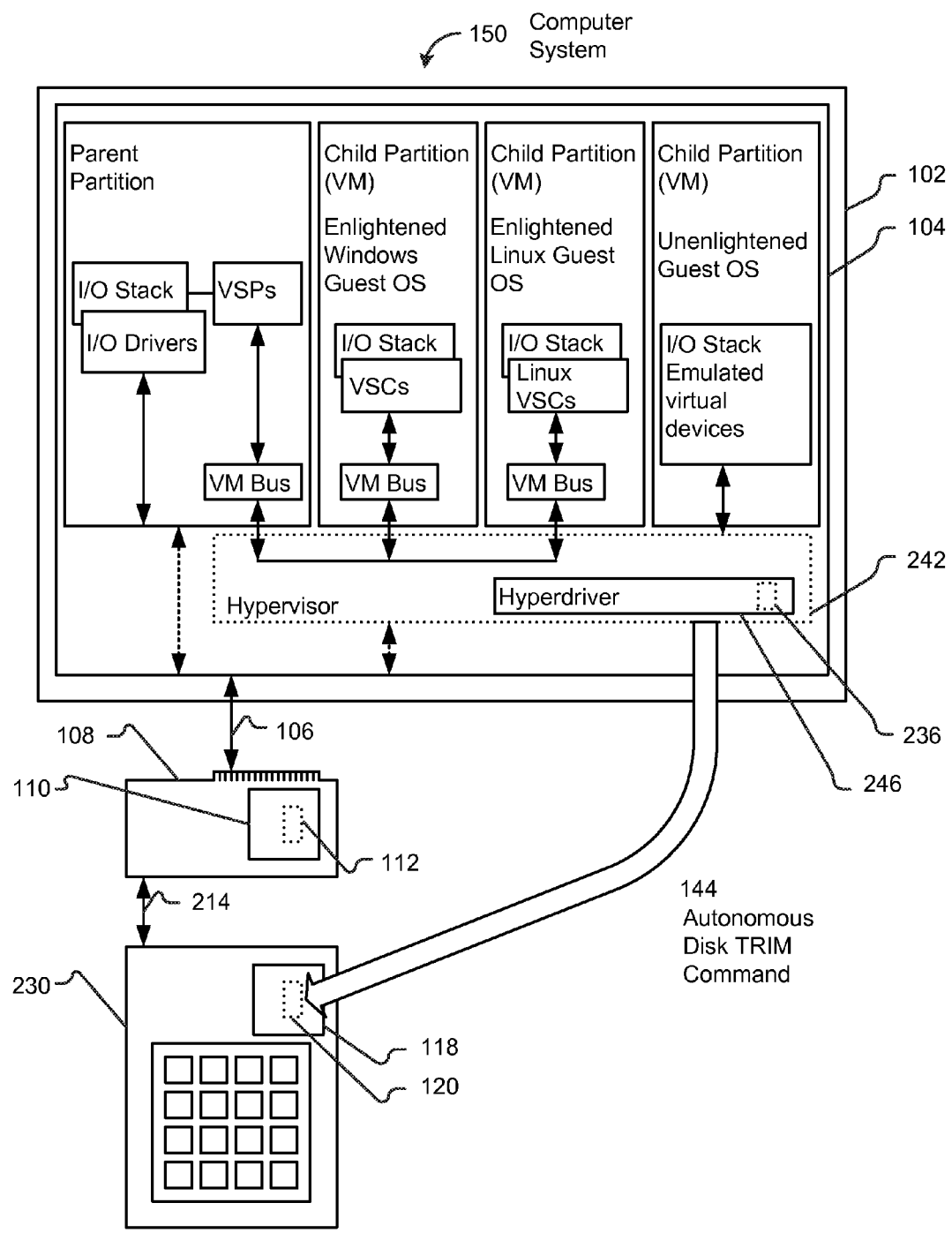

FIG. 2D shows a computer system that is typical of the Windows Hypervisor, Virtualization Stack and Device Virtualization architectures from Microsoft Corporation. In FIG. 2D we have shown the Device Driver 228 of FIG. 2C as a hyperdriver, a general term that we will use to denote a device driver in a hypervisor. In FIG. 2D the Device Driver Logic 236 is part of Hyperdriver 246. In FIG. 2D the Hyperdriver 246, logically connected or coupled to Storage Array Controller Logic 112, issues the Autonomous Disk Trim Command 144. In FIG. 2D the Device Driver Logic 236 may also be implemented in the Parent Partition as part of the Kernel. In such an implementation the Autonomous Disk Trim Command 144 originates in the Kernel.

FIG. 2E shows a computer system that is typical of the Microsoft Hyper-V architecture showing Virtualization Service Providers (VSPs) and Virtualization Service Consumers (VSCs). In FIG. 2E the Hyperdriver 246, logically connected or coupled to Storage Array Controller Logic 112, issues the Autonomous Disk Trim Command 144. In FIG. 2E the Device Driver Logic 236 may also be implemented in the Parent Partition. In such an implementation the Autonomous Disk Trim Command 144 originates in the Parent Partition.

Figure 2F:
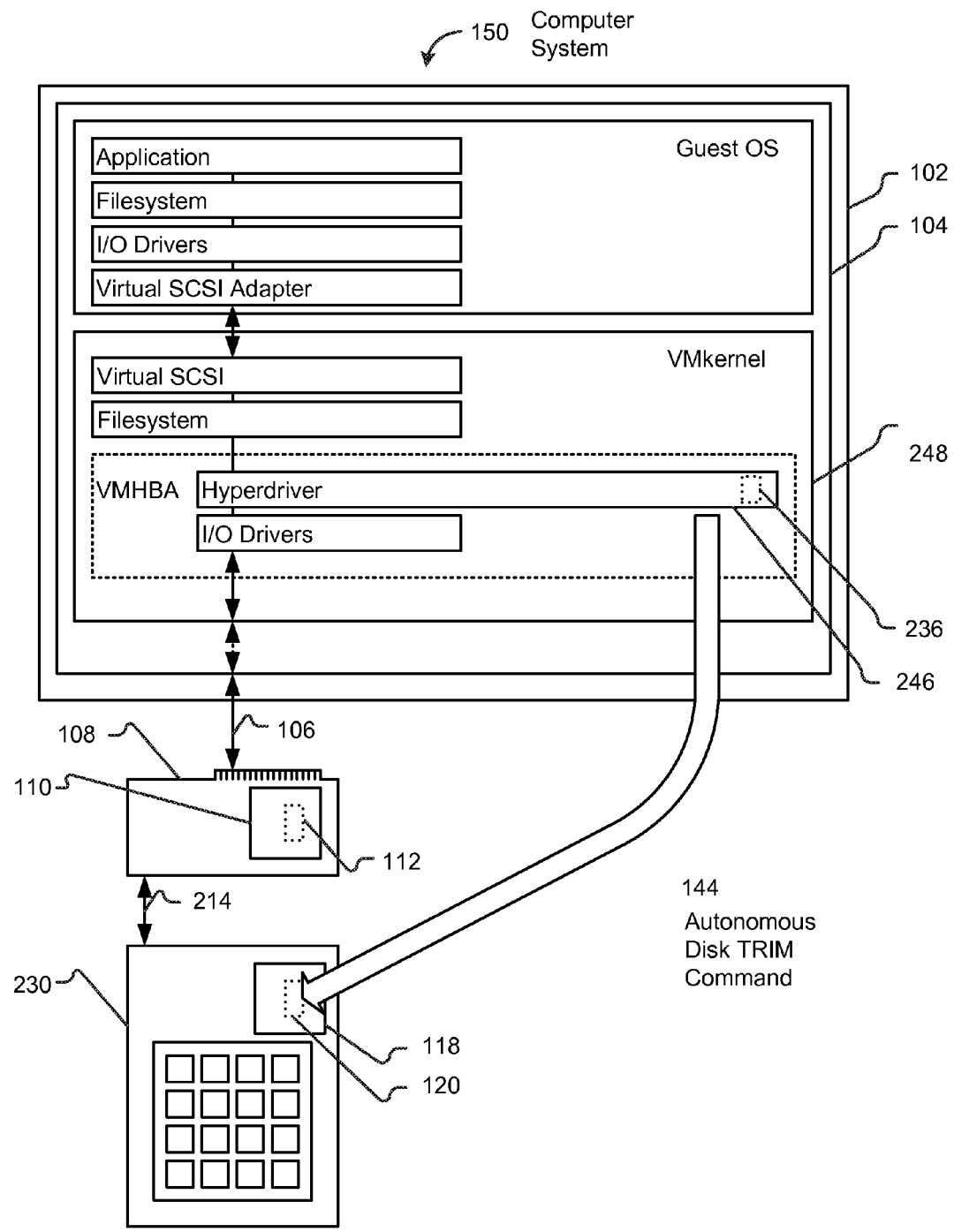

FIG. 2F shows a computer system that is typical of the ESX product available from VMWare and contains a Virtual Machine Kernel (VMkernel) and Virtual Machine Host-Bus Adapter (VMHBA). In FIG. 2F the Device Driver Logic 236 is part of Hyperdriver 246. In FIG. 2F the Hyperdriver 246, logically connected or coupled to Storage Array Controller Logic 112, issues the Autonomous Disk Trim Command 144.

Note that the Device Driver 228 (and thus Device Driver Logic 236) and Storage Array Controller 108 (and thus Storage Array Controller Chip 110 and Storage Array Controller Logic 112) are: (i) separate from the Solid-State Disk Logic 120 used by the Solid-State Disk Controller Chip 118 and (ii) separate from Operating System 158 (or storage-driver software that may be considered part of Operating System 158).

Note that in the following examples and implementations we may simplify descriptions by showing Storage Array Controller 108 (with Storage Array Controller Chip 110 and Storage Array Controller Logic 112) as issuing the autonomous disk trim command (just as we described with reference to FIG. 1). It should now be clear from the description provided with reference to FIG. 2B-2F that a device driver, hyperdriver, or other software may also be used in any of the implementations that are described here. Thus, when we refer to Storage Array Controller Logic 112 (implemented in hardware, software, firmware, or a combination of these, in Storage Array Controller Chip 110) performing some function, recognize that the function may be performed by a combination of Storage Array Controller Logic 112 and Device Driver Logic 236 (implemented in hardware, software, firmware, or a combination of these).

Algorithm 2: Storage Array Controller that Maintains a Map and a Freelist

Figure 3:
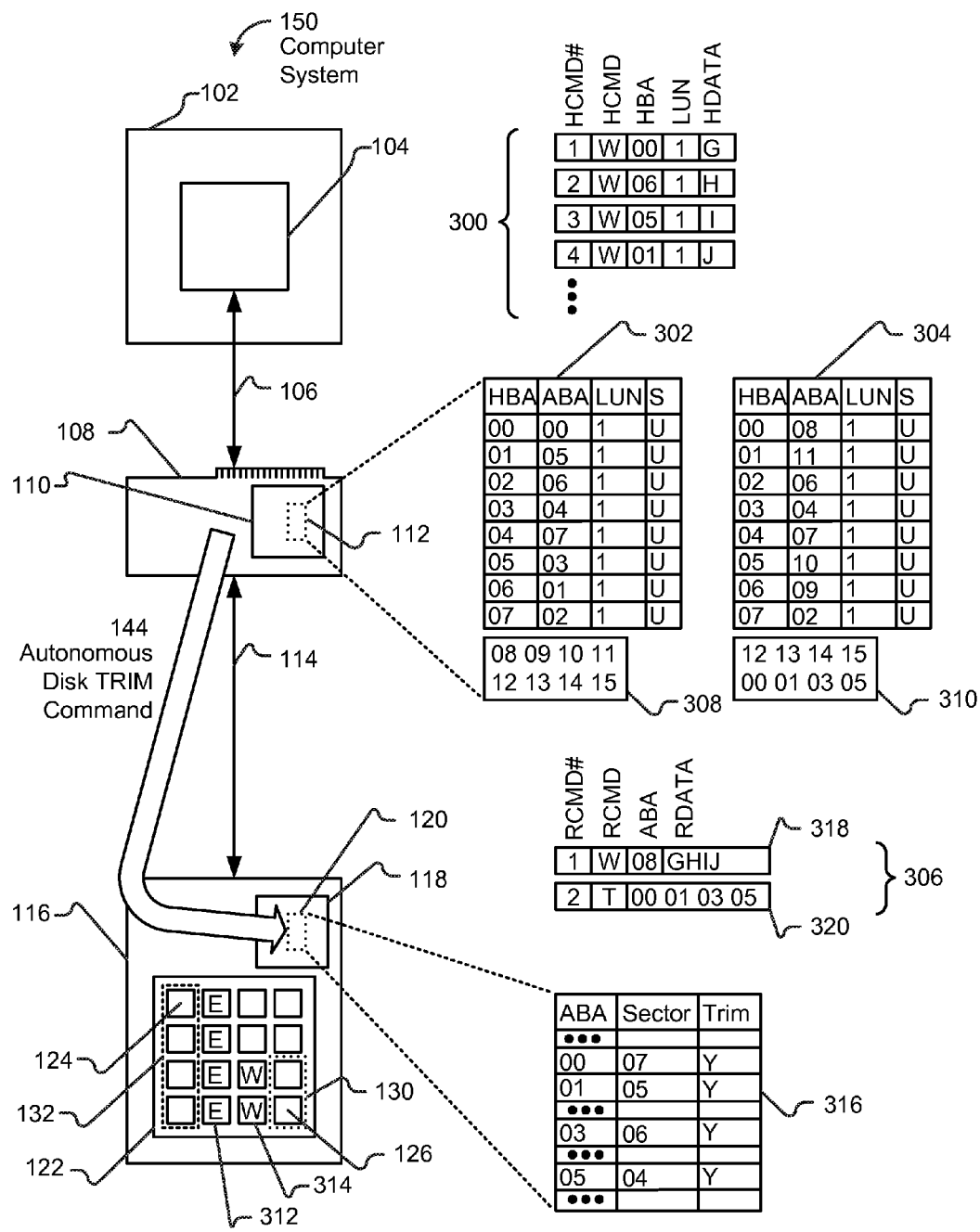
FIG. 3: shows an example of an implementation of a storage array controller that maintains a map and a freelist.

We will now describe Algorithm 2 that builds on Algorithm 1 and that shows how a freelist and map are used. FIG. 3 shows an example of a storage array controller that autonomously issues a disk trim command. The main elements of FIG. 3 are similar to FIG. 1. In FIG. 3 the Host Write Commands (3) 300 include: HCMD#, the host command number; HCMD, the host command (in this example all host commands are W or writes); HBA, the host LBA; LUN; HDATA, the data in the host command. Note that we have stylized the write data as characters G-J to simplify the description. Note that the Host Write Commands (3) 300 are stylized and simplified versions of what a particular host command, in this case a write command, may look like, with the same information content that an industry-standard write command contains (e.g. in a commercial embodiment following an industry standard); but is not necessarily in the exact format used, for example, by the ATA industry standard. Note also that there are other disk commands and other host commands than write commands; and that other forms of all such commands are also possible. In FIG. 3 the writes in Disk Commands (3) 306 are generated from the Host Write Commands (3) 300, but use ABAs instead of HBAs. The Storage Array Controller 108 maps from the HBAs to the ABAs using the Storage Array Controller Logic 112. Additional elements in FIG. 3 illustrate the various states of the data structures that we will use and describe in detail below.

Algorithm 2: get_write_aba_with_trim(hba)

```
// Get the old HBA; Get a new ABA; Update the map
old_aba = hr_map[hba]
new_aba = aba_free.pop( )
hr_map[hba] = new_aba
// issue a disk trim command to the old ABA; Update the freelist
if (old_aba != empty) then trim(old_aba) // Algorithm 1 or equivalent
if (old_aba != empty) then aba_free.push(old_aba)
```

Alternative implementations of Algorithm 2 may include some or all of the following: (i) an asynchronous disk trim command (i.e. the disk trim command is generated at a different time to that described above and to other events); (ii) a disk trim command may specify multiple disk sectors (using multiple data ranges); (iii) any type of storage array including one or more SSDs; (iv) any of the alternative implementations of the other algorithms in this description; (v) ordering the freelist to increase the likelihood that writes to the SSD are to sequential ABAs (even though the HBAs may be to random addresses)

FIG. 3 shows the Map (3a) 302 before any of the writes in the figure are executed and the Map (3b) 304 after the last write shown is executed (i.e. the label "3b" denotes a later time than the label "3a"). In FIG. 3 the Host System 102 sees eight disk sectors, the map contains eight HBAs, and the freelist contains eight ABAs (small numbers are used to simplify the description). In FIG. 3 the Host Write Commands (3) 300 will be to HBAs 00, 06, 05, 01. In FIG. 3, the Map (3a) 302 shows HBAs 00, 06, 05, 01 are used (U) and the corresponding used ABAs are 00, 01, 03, 05. In FIG. 3, the Freelist (3a) 308 contains ABAs 08, 09, 10, 11, 12, 13, 14, 15. The four writes HCMD#1-4 then execute. As a result of the four writes, the four old ABAs 00, 01, 03, 05 in Map (3b) 304 are replaced with four new ABAs: the first four blocks from the freelist, 08, 09, 10, 11.

An old array block address (old ABA) is thus an ABA that is no longer required, containing data that is no longer useful or required; and a new ABA is an ABA, taken from a freelist, that replaces an old ABA and does contain data that is useful or required.

In FIG. 3 the first command, Disk Write Command (3) 318, with RCMD#=1 in the Disk Commands (3) 306 is a sequential write of data G-J to ABAs 08-11. Disk Trim Command (3) 320, with RCMD#=2, is then autonomously issued by the Storage Array Controller 108 specifying the old ABAs 00, 01, 03, 05. In FIG. 3 the Freelist (3b) 310 now contains ABAs 12, 13, 14, 15, 00, 01, 03, 05 (we have left these ABAs unordered to show more clearly the order in which ABAs were added).

Typically an erase of Flash Memory 122 is performed a block at a time, as shown by E in the Erased Flash Block 312 in FIG. 3. Typically a write to Flash Memory 122 is performed a page at a time, as shown by W in the Write to Flash Page 314 in FIG. 3. As a result of Disk Trim Command (3) 320, Solid-State Disk (1) 116 may now perform housekeeping (i.e. delete, free, erase, garbage collection, etc. on flash blocks). For example, Solid-State Disk Logic 120 may contain Solid-State Disk Data Structure 316, which shows that a physical flash block corresponding to ABAs 00, 01, 03, 05 and consisting of disk sectors 04, 05, 06, 07 (marked Y for Yes, in the trim field) may be erased as a result of Disk Trim Command (3) 320. By autonomously issuing disk trim commands, the Storage Array Controller 108 allows the Solid-State Disk (1) 116 to increase the efficiency of write and erase operations.

One feature of Algorithm 2 is for a storage array controller to maintain a map (i.e. map or re-map data) between host and disk(s) and to autonomously issue disk trim commands to the SSD(s) directed to old ABAs.

Algorithm 3: Storage Array Controller that Performs Garbage Collection

Figure 4:
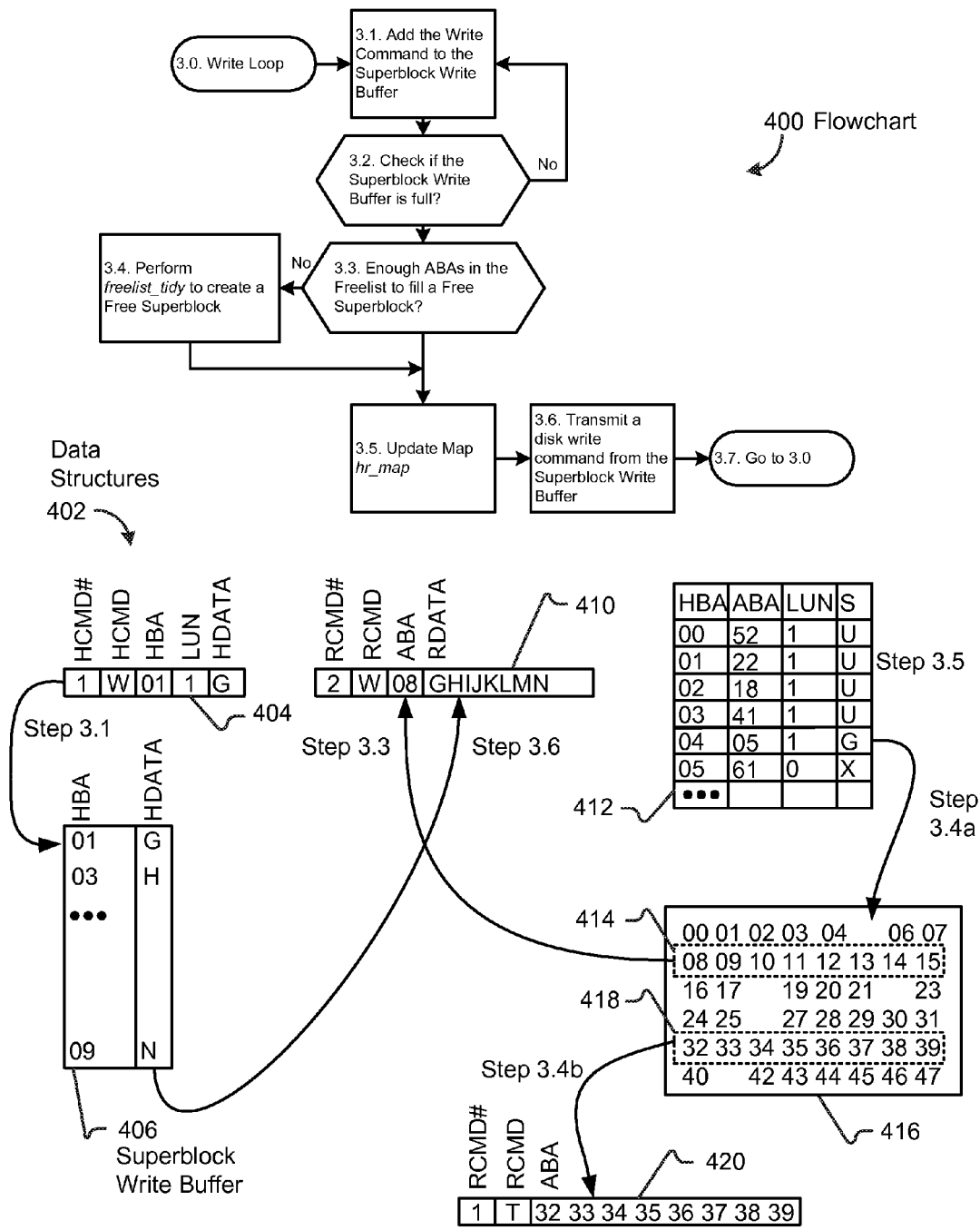
FIG. 4: shows an example of an implementation of a storage array controller that performs garbage collection and issues autonomous disk trim commands.

We will now describe Algorithm 3, which is based on Algorithm 2, and that operates on large groups of sectors called superblocks. FIG. 4 shows the Flow Chart 400 of an algorithm, as well as the associated Data Structures 402, for a write loop that performs garbage collection; uses a superblock for writes; uses a superblock freelist containing free superblocks; and autonomously issues disk trim commands to superblocks. This write loop forms part of an implementation of the Storage Array Controller Logic 112 in Storage Array Controller 108. We will also use Algorithm 3 presently as part of a more complex algorithm.

First we describe garbage collection. In the context of solid-state storage, typically flash memory, when a flash page (or some other portion) of a storage device is no longer required (i.e. it is obsolete, no longer valid, or is invalid) that flash page is marked as dirty. When an entire flash block (typically between 16 to 256 flash pages) is dirty, the entire flash block is erased and free space reclaimed. If free space on the device is low, a flash block is chosen that has some dirty flash pages and some clean (i.e. pages that are not dirty, are good, or valid) flash pages. The clean flash pages are transferred (i.e. written, moved or copied) to a new flash block. All the original clean flash pages are marked as dirty and the old flash block is erased. In the context of solid-state storage, this process of transferring flash pages to new flash blocks and erasing old flash blocks is called garbage collection. The exact technique used for garbage collection, well-known to someone skilled in the art, is not a key part of the algorithms described here. One key idea is that garbage collection is being performed by the storage array controller. We present Algorithm 3 first and then describe each of the steps.

Algorithm 3: get_write_aba_with_GC(hba)
Step 3.0: Write Loop. Process input host write commands. Go to Step 3.1.
Step 3.1. Host write command arrives at storage array controller. Storage array controller adds the host write command fields (HBA plus HDATA) to a superblock write buffer. Go to Step 3.2.
Step 3.2. Check if the superblock write buffer is full. No: Go to Step 3.1. Yes: Go to Step 3.3.
Step 3.3. Check if we have enough ABAs in the freelist to fill a free superblock. No: Go to Step 3.4. Yes: Go to Step 3.5.
Step 3.4. Perform freelist_tidy to create a free superblock. Go to Step 3.5.
Step 3.5. Update hr_map. Go to Step 3.6.//Similar to Algorithm 2 or equivalent Step 3.6. Write the entire superblock to disk. Go to Step 3.7.
Step 3.7. End of Write Loop. Go to Step 3.0.

We will now describe the steps in Algorithm 3 and the data structures shown in FIG. 4 in more detail.

Step 3.1 details: In FIG. 4 the Superblock Write Buffer 406 holds the HBA and HDATA for multiple host write commands. In FIG. 4 Host Write Command (4) 404 is a single host write command to HBA=01 with HDATA=G. In FIG. 4 we have stylized the write data to simplify the description with characters G-N each representing a disk sector of data. In one iteration through Step 3.1, as shown by the arrow labeled Step 3.1 in FIG. 4, HDATA=G has been added to Superblock Write Buffer 406.

Step 3.2 details: In FIG. 4 the Superblock Write Buffer 406 holds eight disk sectors of data and is full (with HDATA=G-N, or eight disk sectors of our stylized data) and thus we will next go to Step 3.3.

Step 3.3 details: FIG. 4 shows Freelist (4) 416 contains 48 ABAs (ordered by ABA). In FIG. 4 blanks in the tabular representation of the Freelist (4) 416 highlight the ABAs that are missing from contiguous ranges. In FIG. 4 we can thus see the blanks correspond to ABAs 05, 18, 22, 26, 41 that are not on Freelist (4) 416 because they are in Map (4) 412 (ABAs 05, 18, 22, 41 are shown; ABA 26 is not). In FIG. 4 a Free Superblock (1) 414 always contains eight ABAs that: (i) are contiguous (i.e. sequential and in a continuous range); (ii) start with an ABA that is aligned to a superblock boundary (i.e. the starting ABA is a multiple of eight, we also call this the superblock address); (iii) are located on the same disk. In FIG. 4 the eight ABAs in a Free Superblock (1) 414 correspond to eight disk sectors of data and to the size of Superblock Write Buffer 406. FIG. 4 shows that Freelist (4) 416 contains Free Superblock (1) 414 (ABAs 08-15), thus we will go to Step 3.5 next. The arrow labeled Step 3.3 in FIG. 4 shows that Free Superblock (1) 414 with starting address ABA 08 is used in the ABA field in Disk Write Command (4) 410.

Step 3.4 details: freelist_tidy performs garbage collection to produce a free superblock. In Map (4) 412 HBA 04 is marked for garbage collection with S=G. The garbage collection process in freelist_tidy can thus add ABA 05 to Freelist (4) 416 (as shown by the arrow labeled Step 3.4a in FIG. 4). When ABA 05 is added to Freelist (4) 416 a free superblock will be created that contains ABAs 00-07 (this step is not shown in FIG. 4). To illustrate the process we have shown Free Superblock (2) 418 that has already been created. Free Superblock (2) 418 contains HBAs 32-39 and as a result we can autonomously issue Disk Trim Command (4) 420 directed at a superblock of eight ABAs (shown by the arrow labeled Step 3.4b in FIG. 4).

Step 3.5 details: To describe how we update map hr_map we focus on the first entry in Superblock Write Buffer 406 (corresponding to Host Write Command (4) 404 to HBA=01) in FIG. 4. We see from Map (4) 412 in FIG. 4 that HBA 01 is currently mapped to ABA 22 (in the row labeled Step 3.5). We take the first ABA from Free Superblock (1) 414 as a new ABA (from FIG. 4, this is ABA 08, new aba=08). We will update hr_map to map HBA 01 to new ABA 08 (this is not shown in FIG. 4). We will mark new ABA 08 with S=U (this is not shown in FIG. 4). We will mark old ABA 22 with S=G (old aba=22, this is not shown in FIG. 4). We then continue updating hr_map with the next write (from FIG. 4, the next write is to HBA=03) and so on. The map update process was described in Algorithm 2.

Step 3.6 details: In FIG. 4 the Disk Write Command (4) 410 is a write command to ABAs 00-07 and contains a superblock of data G-N from Superblock Write Buffer 406 (as shown by the arrow labeled Step 3.6 in FIG. 4).

Alternative implementations for Algorithm 3 may include one or more of the following: (i) Step 3.4 freelist_tidy may be performed asynchronously (i.e. at a different time) to any write commands so that at most times (and preferably at all times) there is at least one free superblock; (ii) in practice a superblock (and free superblock) will be much larger than the disk sector size, flash block size, or flash page size and could be 32 Mbytes, or more, for example; (iii) if the SSD capacity is 100 Gbyte and a superblock is 1 Gbyte, then to avoid filling the disk we might inform the OS that the SSD capacity is 99 Gbyte for example; (iv) a superblock may contain elements at any granularity or size: for example an element may be a disk sector (512 bytes, for example); but an element may be larger or smaller than 512 bytes, and an element may be larger or smaller than a disk sector; (v) any type of storage array containing one or more SSDs; (vi) any of the alternative implementations of the other algorithms in this description.

As a side note the reader is cautioned that superblock is used in other contexts (filesystems and NAND flash being examples), but that the contexts are close enough that confusion might result if not for this warning. The superblock described here is a collection of disk sectors (block being a common alternative term for disk sector).

The ideas of Algorithm 3 include that a storage array controller: (i) maintains a map between host and disk (i.e. maps or re-maps data), (ii) performs garbage collection, and (iii) autonomously issues disk trim commands directed to superblocks. The storage array controller presents all write and erase operations (including disk trim commands) to an SSD at the granularity of a superblock and this greatly helps the SSD perform its functions, including the garbage collection process of the SSD. Other implementations of Algorithm 3, with other features, are possible without altering these ideas.

Storage Array Controller with Asynchronous Garbage Collection

We will now describe Algorithm 4, based on Algorithm 3, and that contains the majority of the logic required by a storage array controller. Algorithm 4 includes a detailed implementation of an example garbage collection process. Note that many (or indeed any) garbage collection algorithms may be used. Each major step below is a separate stage of operation: steps 4.1, 4.2, 4.3, 4.4, 4.5, and 4.6 correspond to: (i) initialization of the storage device or array; (ii) creation of LUNs; (iii) handling of write commands; (iv) deletion of LUNs; (v) increasing LUN size; (vi) decreasing LUN size.

Algorithm 4: Storage_Controller_1
Step 4.1: Initialization: issue disk trim commands to all ABAs on all disks//Nothing on disk(s)
Step 4.2: LUN creation: set LUN_size=C2
Step 4.3: Write Loop: while there are write commands:
Step 4.3.1: get_write_aba(hba)//pop from aba_free_1 & push to aba_free_2
Step 4.3.2: if threshold_reached( ) go to Step 4.3.3 else go to Step 4.3.1
Step 4.3.3: update aba_free_1( ); go to Step 4.3.1//start using An+3
Step 4.4: LUN deletion:
Step 4.4.1. Issue disk trim commands to all ABAs that are mapped to the LUN
Step 4.4.2. Remove all ABA mappings for the LUN and add the ABAs to the freelist aba_free_1
Step 4.5: LUN increase size: no action required
Step 4.6: LUN decrease size:
Step 4.6.1. Issue a disk trim command specifying all ABAs that are mapped to the LUN region being removed
Step 4.6.2. Remove all ABA mappings for the LUN region being removed and add the ABAs to the freelist aba_free_1

Figure 5:
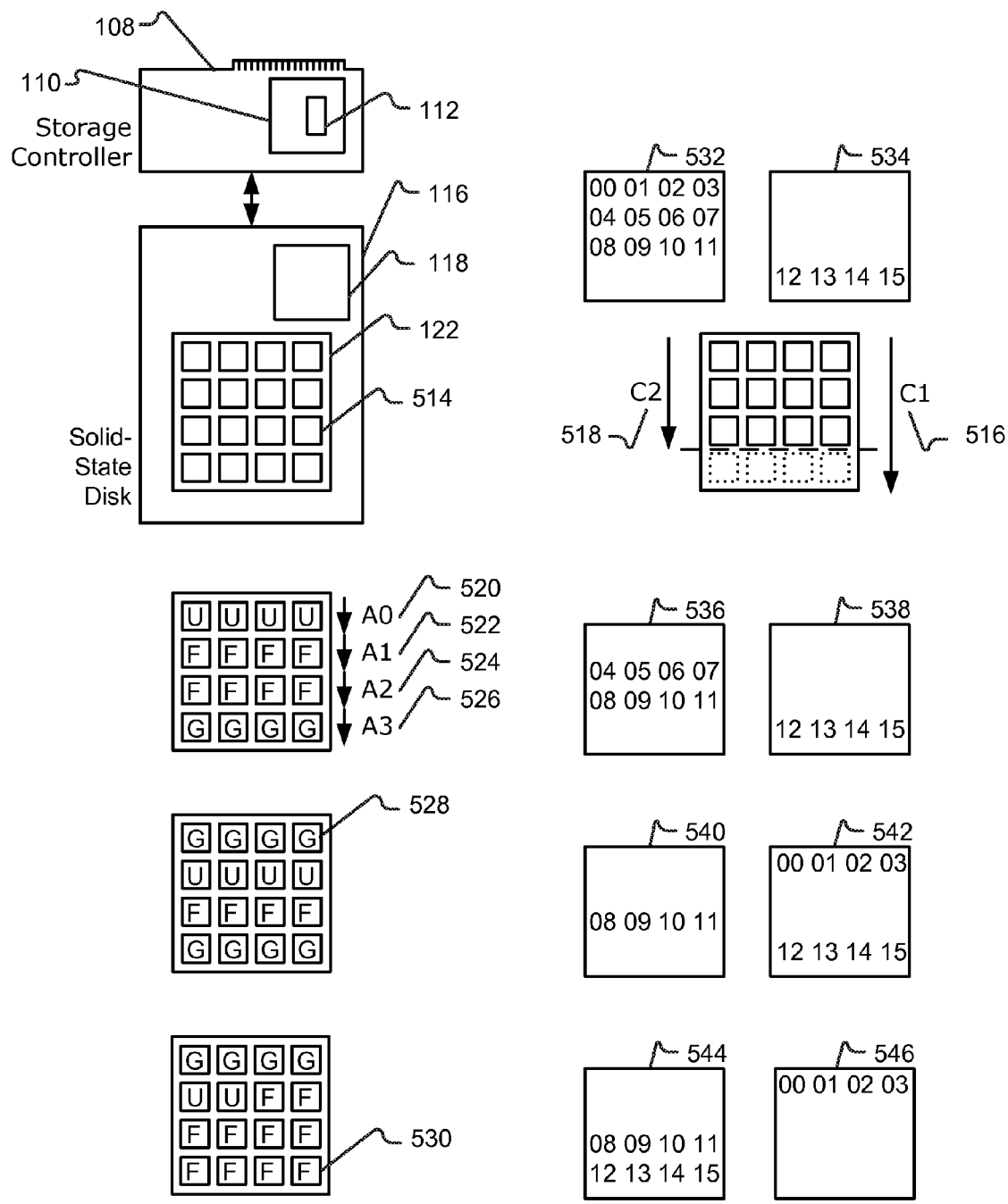
FIG. 5 illustrates an example of an implementation of a garbage collection algorithm.

FIG. 5: illustrates the write loop of Step 4.3. The storage array controller in FIG. 5 may use the entire disk capacity so that an SSD may perform more efficient garbage collection.

The main elements of FIG. 5 are similar to those of FIG. 1. Several components of FIG. 1 that are not central to Step 4.3 of Algorithm 4 have been omitted from FIG. 5 for clarity. In FIG. 5 the Sectors 514 are shown in an ordered manner so as to simply the description, but the Storage Array Controller Logic 112 may re-order the physical disk sector locations. Thus the Sectors 514 shown in the various parts of FIG. 5 should be viewed as logical disk sectors rather than physical disk sectors.

In FIG. 5 the Solid-State Disk Capacity 516 is 16 disk sectors (C1). In FIG. 5 the Solid-State Disk LUN Size 518 as reported to the OS is 12 disk sectors (C2). In FIG. 5 there are two freelists: the Primary Freelist using data structure aba_free_1 and the Secondary Freelist using aba_free_2. After Step 4.1 and 4.2, Primary Freelist (a) 532 contains ABAs 00-11 and Secondary Freelist (a) 534 contains ABAs 11-15. Step 4.3.1 uses free ABAs from the Primary Freelist (pop), but returns free ABAs to the Secondary Freelist (push).

In FIG. 5 Freelist 1 (b) 536, ABAs 00-03 have been removed and four disk sectors in Area 0 520 (A0) have been written and marked U for used. During these writes Secondary Freelist (b) 538 is unchanged and allows Solid-State Disk (1) 116 to perform garbage collection more efficiently on Area 3 526 (A3), marked G for garbage. As we continue to write to Area 0 520, Area 1 522 (A1), and Area 2 524 (A2) (but not to Area 3 526) we return free ABAs to Secondary Freelist. In FIG. 5 ABAs 04-06 have been removed from Primary Freelist (c) 540. In FIG. 5 ABAs 00-03 have been added to Secondary Freelist (c) 542. In FIG. 5 the area marked Dirty Area 528 contains ABAs 00-03 and is marked G. This Dirty Area 528 will now remain on Secondary Freelist and allow Solid-State Disk (1) 116 to perform its own garbage collection more efficiently.

Next, assume that threshold_reached is now true in Step 4.3.2. For example, we can count the ABAs used and set a threshold at four. In FIG. 5, as a result of Step 4.3.3, four ABAs 12-15 were removed from Secondary Freelist (d) 546, and added to Primary Freelist (d) 544 as the Clean Area 530 and marked F for free. We continue in this fashion: we add LBAs to Secondary Freelist one-by-one and later transfer them to Primary Freelist in a large pool.

One idea of Algorithm 4 is to allow the storage array controller to manage writing to a large and rotating pool of dirty sectors. The result is that an SSD controller (under or below the storage array controller hierarchically, i.e. closer to the storage devices) may perform its own more efficient garbage collection and clean large dirty areas of flash blocks and flash pages.

Alternative implementations for Algorithm 4 may include one of more of the following: (i) the capacities, the numbers of disk sectors, and sizes of the pools and areas described are many orders of magnitude higher in practice: C1 may be 100 GB and C2 may be 80 GB for example; (ii) instead of a single LUN C2 we can use multiple LUNs: C2, C3, . . . , Ci, and then Step 4.2 will check that the sum of Ci is less than C1; (iii) other algorithms may be used to set the area of dirty sectors: a fixed pool (rather than rotating), or multiple pools, might be used for example; (iv) other algorithms may be used to set the threshold(s), pool size(s), and location(s); (v) the freelist(s) may be various relative sizes, split, and maintained in different ways that may improve the efficiency and speed of the algorithm; (vi) in Step 4.3.3 we change to use area An+3 (modulo 4 or the number of areas): thus if we were using Area 0 (A0), change to Area 3 (A3); from Area 2 (A2) we change to Area 1 (A1), etc.) and this example assumes we have four areas, but the algorithm may use any number of areas; (vii) set the threshold of the test in Step 4.3.2 by using number of writes performed, by number of ABAs used, or any other method; (viii) Step 4.1 may autonomously issue a standard ATA secure erase command to all disks (this will typically mark all ABAs as free, but possibly also erasing SSD wear-leveling and other housekeeping data); (ix) Step 4.1 may autonomously issue a secure erase command that does not erase wear-leveling data; (x) any of the alternative implementations of the other algorithms in this description.

Storage Array Controller for Large Capacity SSDs

We have presented Algorithms 1, 2, 3, and 4 using small disks as examples and correspondingly small numbers to simplify the descriptions. We now describe Algorithm 5 as an example of a storage array controller for use with one or more solid-state disks using components typical of the 2010 timeframe. Algorithm 5 described below may be viewed as a combination of previously described algorithms. This implementation will thus illustrate ideas already described, but in a more realistic and contemporary context.

Figure 6:
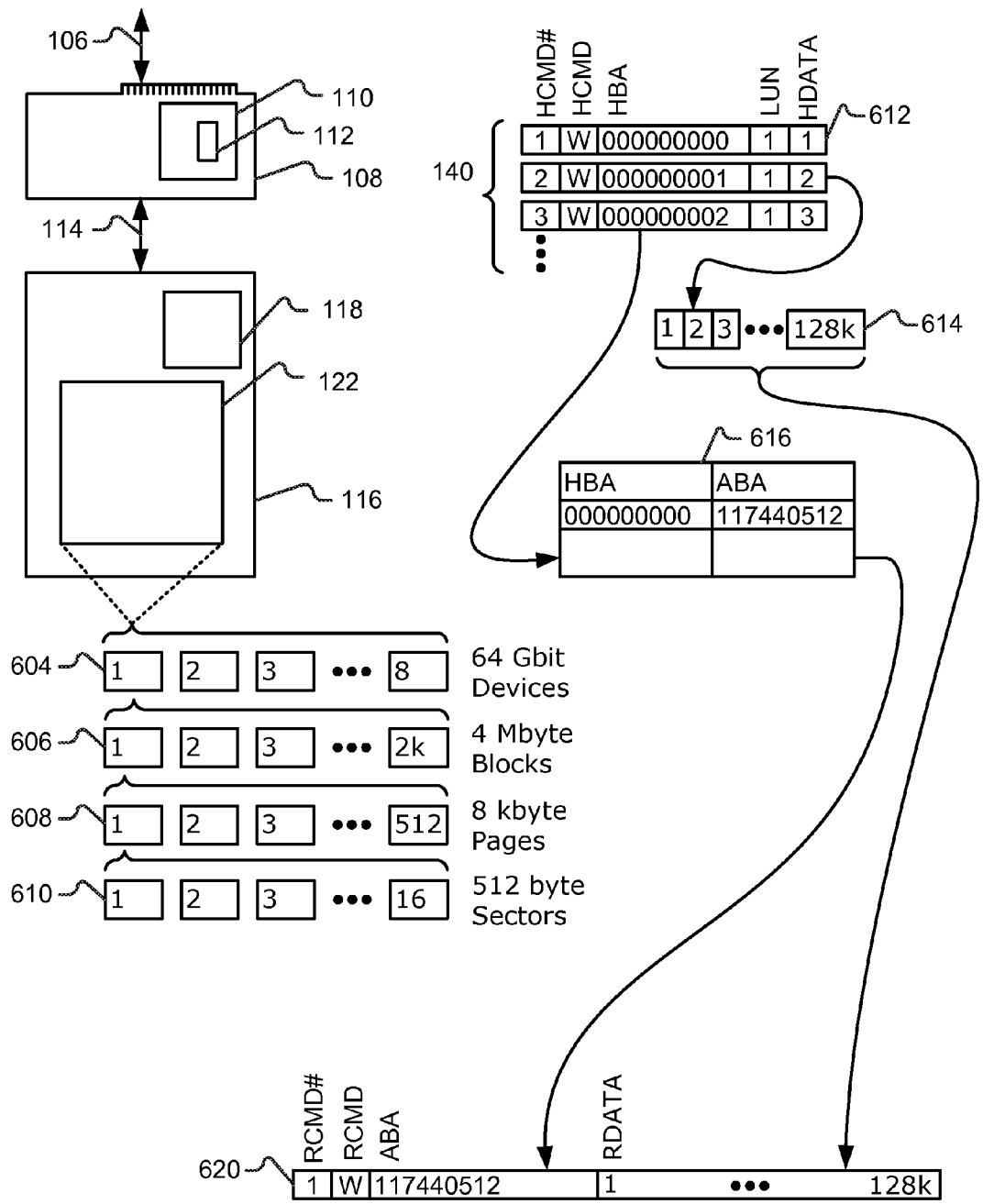
FIG. 6 shows an example of an implementation of a storage array controller for use with one or more large-capacity SSDs and illustrates the storage structure.

FIG. 6 shows the structure of the storage in a 64-Gbyte SSD. The main elements of FIG. 6 are similar to FIG. 1 and other previous Figures. In FIG. 6 Solid-State Disk (1) 116 contains a Solid-State Disk Controller Chip 118 and Flash Memory 122. In FIG. 6 Flash Memory 122 consists of eight 64-Gbit Flash Devices 604. The 64-Gbit Flash Devices 604 each consist of 2 k (2048) 4-Mbyte Flash Blocks 606. The 4-Mbyte Flash Blocks 606 each consist of 512 8-kbyte Flash Pages 608. The 8-kbyte Flash Pages 608 each consist of 16 512-byte Disk Sectors 610. Solid-State Disk (1) 116 thus contains 16×2 k 32 k (32768) flash blocks; 8×2 k×512 or 8M (8388608) flash pages; and 16×2 k×256×16 or 128M (134217728) disk sectors. These are practical numbers for a NAND flash device in the 2010 timeframe. For example, the Micron 32-Gbit NAND flash, part number MT29H32G08GCAH2, contains 8 k 512-kbytes flash blocks, and 128 4-kbyte flash pages per block.

In FIG. 6 the IO Bus 106 communicates a Host Write Command (6) 612 to the Storage Array Controller 108. In FIG. 6 the Host Write Command (6) 612 uses an LBA that addresses 512-byte disk sectors. In FIG. 6 therefore, the Storage Array Controller 108 receives commands with a 512-byte disk sector granularity. In FIG. 6 the Storage Array Controller Chip 110 and the Storage Array Controller Logic 112 use a Superblock 614. In FIG. 6 the Superblock 614 consists of 128 k (131072) 512-byte Disk Sectors so that Superblock 614 is 64 Mbytes. In FIG. 6 the Disk Write Command (6) 620 contains an ABA address of 0-134217727 aligned to a superblock boundary (a multiple of 128 k) that addresses a 512-byte disk sector. The Disk Write Command (6) 620 always uses a superblock of data in the RDATA field.

In FIG. 6 Map (6) 616 shows a list of ABAs, ordered by HBA. In FIG. 6 Map (6) 616 may thus have up to 134217728 rows (neglecting, for the moment, any ABAs on a freelist that we have omitted from FIG. 6 to simplify the description). Since the integer number 134217728 requires 27 binary bits, we may need a 4-byte (32-bit) field to store each of the ABA entries. In FIG. 6 Map (6) 616 would require up to 4 bytes× 134217728, equal to 536,870,912 bytes or about 550 Mbytes, to store the ABA information. This may be too much data to store economically. Using the concept of a superblock, we can simplify Map (6) 616.

Figure 7:
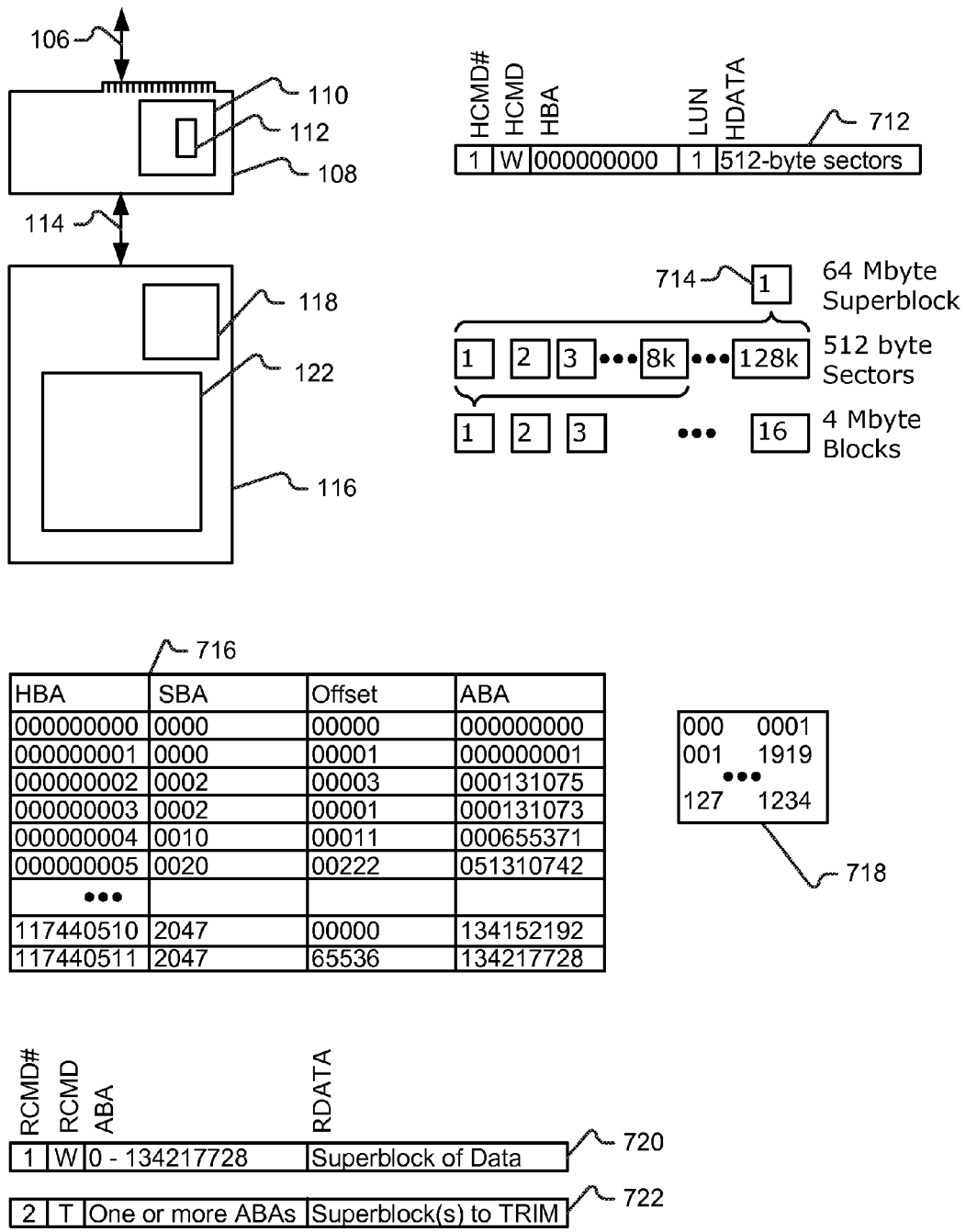
FIG. 7 shows an example of an implementation of a storage array controller for use with one or more large-capacity SSDs and illustrates the use of superblocks.

FIG. 7 shows how we can simplify the map for a storage array controller attached to one or more large capacity SSDs. FIG. 7 also illustrates how the storage array controller performs garbage collection by autonomously issuing disk trim commands to superblocks. The main elements of FIG. 7 are similar to the main elements in previous Figures. We will use superblock address (SBA) for the address of a Superblock (7)

714. In FIG. 7 the Map (7) 716 contains HBAs that are addresses of 512-byte disk sectors and contains SBAs that are the addresses of 64-Mbyte superblocks. In FIG. 7 the Freelist (7) 718 contains 128 superblocks (labeled 000-127). The number of superblocks in the freelist will vary with time. In FIG. 7, at the instant in time shown, Map (7) 716 thus contains 134217728−(128×131072) or 117440512 rows. In FIG. 7 the Map (7) 716 thus contains (2048−128) or 1920 SBAs that are in use. In FIG. 7 the Map (7) 716 is shown containing the ABA field, but the ABA may be calculated using the SBA and an Offset within the SBA: ABA=(SBA×65536)+Offset. The use of superblocks and the SBA allows the storing and manipulations of Map (7) 716 to be simplified in several ways, well-known to someone skilled in the art, that are not a key part of the ideas presented here, but may allow these ideas to be implemented by other means.

In FIG. 7 the Host Write Command (7) 712 contains HDATA at 512-byte disk sector granularity. The storage array controller receives host write commands until the storage array controller has accumulated a Superblock (7) 714 worth of HDATA in a write buffer. The storage array controller then removes a superblock from the Freelist (7) 718. The storage array controller then updates Map (7) 716. The storage array controller then generates a Disk Write Command (7) 720 with a superblock of data. The storage array controller then performs garbage collection, as we have described above, and possibly moving one or more old superblock(s) to the freelist. As a result of this garbage collection, the storage array controller may autonomously issue a Disk Trim Command (7) 722 directed to one (or more) old superblock(s) with starting addresses at one (or more) superblock-aligned ABA(s).

Algorithm 5: Storage_Controller_2//Combination of Algorithm 3 &4
Step 5.1: Initialization: issue a disk trim command to all ABAs on all disks//Nothing on disk
Step 5.2: LUN creation: set LUN_size=C2//C2<C1=disk capacity
Step 5.3: get_write_aba_with_GC(hba)//Use Algorithm 3 or equivalent
Step 5.3.0: Write Loop. Process input host write commands. Go to Step 5.3.1.
Step 5.3.1. Host write command arrives at storage array controller. Storage array controller adds the host write command (HBA plus HDATA) to a write buffer. Go to Step 5.3.2.
Step 5.3.2. Check if the superblock write buffer is full. No: Go to Step 5.3.1. Yes: Go to Step 5.3.3.
Step 5.3.3. Check if we have enough ABAs in the freelist to fill a free superblock. No: Go to Step 5.3.4. Yes: Go to Step 5.3.5.
Step 5.3.4. Perform freelist_tidy to create a free superblock. Go to Step 5.3.5.
Step 5.3.5. Update hr_map. Go to Step 5.3.6.
Step 5.3.6. Transmit a disk write command from the superblock write buffer. Go to Step 5.3.7.
Step 5.3.7. End of Write Loop. Go to Step 5.3.0.
Step 5.4: LUN deletion:
Step 5.4.1. Issue a disk trim command to all ABAs that are mapped to the LUN
Step 5.4.2. Remove all ABA mappings for the LUN and add the ABAs to the freelist aba_free_1
Step 5.5: LUN increase size: no action required
Step 5.6: LUN decrease size:
Step 5.6.1. Issue a disk trim command specifying all ABAs that are mapped to the LUN region being removed
Step 5.6.2. Remove all ABA mappings for the LUN region being removed and add the ABAs to the freelist aba_free_1

In FIG. 7 the 64-Mbyte Superblock 614 consists of 16 4-Mbyte Flash Blocks. The 64-Gbit Flash Devices 604 (and NAND flash devices in general) typically only permit erase to be performed a flash block at a time and writes are performed a flash page at a time. In FIG. 7 the Disk Trim Command (6) 622 contains a start ABA address of 0-134217727 that is aligned to a superblock boundary and addresses a 512-byte disk sector. The Disk Trim Command (6) 622 always specifies a superblock. Thus, as shown in FIG. 7, the Solid-State Disk (1) 116 always receives write commands and trim commands with a superblock granularity, and thus the SSD may perform its own functions (e.g. write, erase, garbage collection, etc.) much more efficiently.

Alternative implementations for Algorithm 5 may include one or more of the following: (i) other sizes of superblock; (ii) multiple superblock sizes; (iii) any type of storage array containing one or more SSDs; (iv) any of the alternative implementations of the other algorithms in this description.

Figure 8:
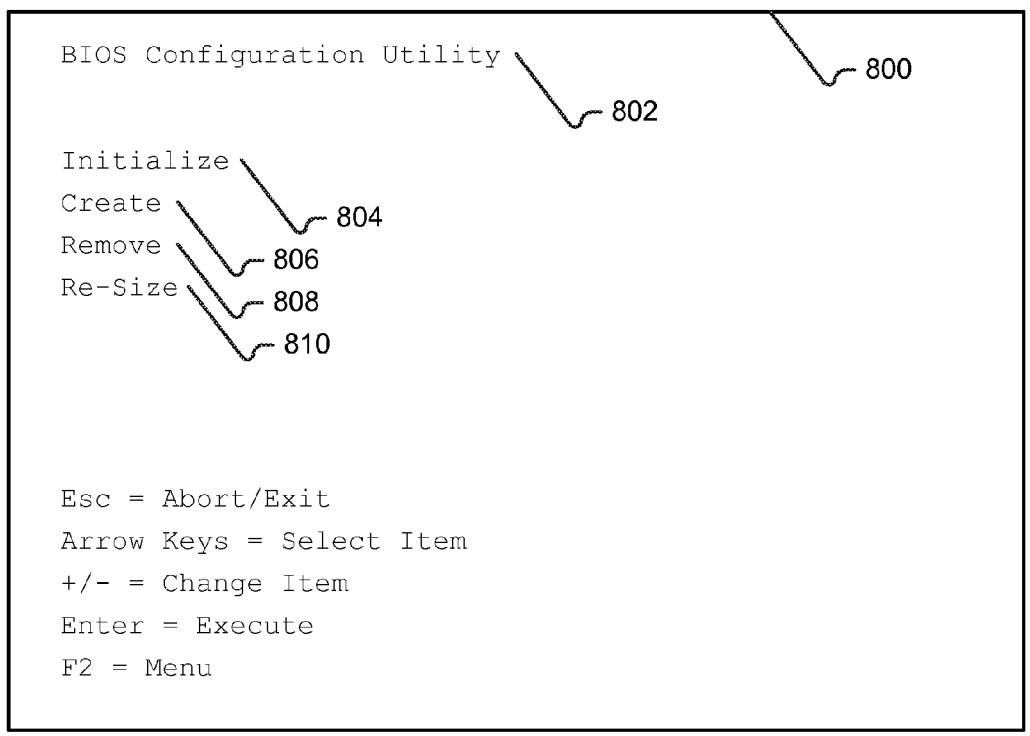
FIG. 8 shows a screenshot of a BIOS Configuration Utility for a storage array controller.

FIG. 8 shows a screenshot of a BIOS Configuration Utility for a storage array controller. The layout, contents and functions shown are illustrative and other names for the functions may be used, a different layout or series of screen layouts may be used, commands may instead be performed on a Linux or DOS command line or equivalent, etc. In FIG. 8 Screen 800 contains the following options for BIOS Configuration Utility 802: Initialize 804, Create 806, Remove 808, Re-Size 810. These example options may correspond, for example, to steps 5.1, 5.2, 5.4, 5.5/5.6 of Algorithm 5. Such operations may be performed on one or more LUNs that are part of a storage array or the entire storage array. Thus part or all of the steps and functions described in the algorithms presented here may be performed in BIOS as part of a Configuration Utility or as part of other software utilities. For example, selecting Initialize 804 (by using arrow keys for example) in Screen 800 and pressing the Enter key may cause a disk trim command to be issued to all solid-state disks in an array. Other BIOS Configuration Utility options may similarly cause one or more disk trim commands to be issued as has been described.

CONCLUSION

Numerous variations and modifications based on the above description will become apparent to someone with skill in the art once the above description is fully understood. It is intended that the claims that follow be interpreted to embrace all such variations and modifications.

| REFERENCE SIGNS LIST | |
|---|---|
| 102 | Host System |
| 104 | CPU |
| 106 | IO Bus |
| 108 | Storage Array Controller |
| 110 | Storage Array Controller Chip |
| 112 | Storage Array Controller Logic |
| 114 | Storage Bus |
| 116 | Solid-State Disk (1) |
| 118 | Solid-State Disk Controller Chip |
| 120 | Solid-State Disk Logic |
| 122 | Flash Memory |
| 124 | Disk Sector (00) |
| 126 | Disk Sector (15) |
| 128 | Other Storage Array Devices |
| 130 | Flash Page |
| 132 | Flash Block |
| 134 | Disk Sectors |
| 136 | Map (1) |
| 138 | Freelist (1) |
| 140 | Disk Commands (1) |

-continued

| REFERENCE SIGNS LIST | |
|---|---|
| 142 | Disk Trim Command (1) |
| 144 | Autonomous Disk Trim Command |
| 146 | Storage Subsystem |
| 148 | Storage Array |
| 150 | Computer System |
| 152 | Solid-State Disk (2) |
| 154 | Hard Disk (1) |
| 156 | Hard Disk (2) |
| 158 | Operating System |
| 214 | Serial Storage Bus (1) |
| 216 | Serial Storage Bus (2) |
| 218 | Serial Storage Bus (3) |
| 226 | File System |
| 228 | Device Driver |
| 230 | Solid-State Disk (3) |
| 232 | Solid-State Disk (4) |
| 234 | Hard Disk (3) |
| 236 | Device Driver Logic |
| 238 | Software |
| 240 | Software Bus |
| 242 | Hypervisor |
| 244 | Software Bus (2) |
| 246 | Hyperdriver |
| 248 | VMkernel |
| 300 | Host Write Commands (3) |
| 302 | Map (3a) |
| 304 | Map (3b) |
| 306 | Disk Commands (3) |
| 308 | Freelist (3a) |
| 310 | Freelist (3b) |
| 312 | Erased Flash Block |
| 314 | Write to Flash Page |
| 316 | Solid-State Disk Data Structure |
| 318 | Disk Write Command (3) |
| 320 | Disk Trim Command (3) |
| 400 | Flow Chart |
| 402 | Data Structures |
| 404 | Host Write Command (4) |
| 406 | Superblock Write Buffer |
| 410 | Disk Write Command (4) |
| 412 | Map (4) |
| 414 | Free Superblock (1) |
| 416 | Freelist (4) |
| 418 | Free Superblock (2) |
| 420 | Disk Trim Command (4) |
| 514 | Sectors |
| 516 | Solid-State Disk Capacity |
| 518 | Solid-State Disk LUN Size |
| 520 | Area 0 |
| 522 | Area 1 |
| 524 | Area 2 |
| 526 | Area 3 |
| 528 | Dirty Area |
| 530 | Clean Area |
| 532 | Primary Freelist (a) |
| 534 | Secondary Freelist (a) |
| 536 | Primary Freelist (b) |
| 538 | Secondary Freelist (b) |
| 540 | Primary Freelist (c) |
| 542 | Secondary Freelist (c) |
| 544 | Primary Freelist (d) |
| 546 | Secondary Freelist (d) |
| 604 | 64-Gbit Flash Devices |
| 606 | 4-Mbyte Flash Blocks |
| 608 | 8-kbyte Flash Pages |
| 610 | 512-byte Disk Sectors |
| 612 | Host Write Command (6) |
| 614 | Superblock |
| 616 | Map (6) |
| 620 | Disk Write Command (6) |
| 622 | Disk Trim Command (6) |
| 712 | Host Write Command (7) |
| 714 | Superblock (7) |
| 716 | Map (7) |
| 718 | Freelist (7) |
| 720 | Disk Write Command (7) |
| 722 | Disk Trim Command (7) |

-continued

| REFERENCE SIGNS LIST | |
|---|---|
| 800 | Screen |
| 802 | BIOS Configuration Utility |
| 804 | Initialize |
| 806 | Create |
| 808 | Remove |
| 810 | Re-Size |

What we claim is:

1. A storage array controller operable to be coupled to a host system and operable to be coupled to a managed storage array;
the host system comprising one or more host storage drivers and at least one host operating system comprising one or more host file systems, at least one of the host file systems logically coupled to at least one host storage driver, and at least one host storage driver operable to be logically coupled to the storage array controller, and the storage array comprising one or more solid-state storage devices comprising one or more solid-state storage device controllers;
and wherein the storage array controller is operable to receive host commands from at least one host storage driver, the host commands being generated by at least one host operating system and comprising storage commands directed to the storage array; the storage array controller is further operable to generate autonomously or in an autonomous manner one or more disk trim commands including one or more array block addresses in response to one or more of the received host commands; and the storage array controller is further operable to transmit the generated one or more disk trim commands to at least one of the solid-state storage device controllers.

2. The storage array controller of claim 1 wherein the host system is not operable for generating the generated one or more disk trim commands.

3. The storage array controller of claim 1 wherein the generating one or more disk trim commands further comprises merging or translating one or more host trim commands into the one or more disk trim commands.

4. The storage array controller of claim 1 wherein the receiving host commands further comprises one or more of the following operations: updating a map from a plurality of host block addresses to a plurality of array block addresses; and placing one or more old array block addresses in the one or more disk trim commands.

5. The storage array controller of claim 1 wherein storage array management is performed in software; and wherein the storage array controller includes at least a portion of the storage array management software.

6. The storage array controller of claim 1 wherein at least a first portion of the storage array management is performed in software in a hypervisor; wherein the first portion of storage array management software in the hypervisor includes a device driver or hyperdriver; and wherein a second portion of storage array management software is included in the storage array controller.

7. The storage array controller of claim 1 wherein the storage array management further comprises:
maintaining one or more maps and one or more freelists;
performing garbage collection on at least one of the one or more maps and one or more freelists as a result of the receiving of the one or more host commands;

generating one or more superblocks; and placing one or more superblock addresses of the one or more superblocks in the one or more disk trim commands.

8. A storage array controller included in or operable to be coupled to a host system and included in or operable to be coupled to a storage array; wherein the storage array includes a plurality of storage devices; wherein the plurality of storage devices includes at least one solid-state storage device; wherein the host system manages a first set of logical storage addresses; wherein the storage array controller manages a second set of logical storage addresses; wherein at least one of the at least one solid-state storage devices manages a set of physical storage addresses; wherein the first set of logical storage addresses comprises at least one set of host block addresses; wherein the second set of logical storage addresses comprises at least one set of array block addresses; wherein the set of physical block addresses comprises at least one set of physical block numbers; wherein the storage array controller is operable to transmit at least one disk command to the storage array; wherein the storage array controller is operable to receive one or more host commands from the host system; wherein the host commands comprise storage commands; wherein the storage array controller is operable to issue one or more disk trim commands to the at least one solid-state storage device; and wherein the one or more disk trim commands comprise one or more array block addresses.

9. The storage array controller of claim 8 wherein the storage array controller maintains a map; wherein the storage array controller maintains a freelist; wherein the map converts host block addresses to array block addresses; wherein the freelist includes a plurality of free array block addresses; and wherein the storage array controller is operable to autonomously issue the one or more disk trim commands to at least one of the at least one solid-state storage device.

10. The storage array controller of claim 9 wherein the storage array controller is operable to place one or more of the plurality of free array block addresses in the one or more disk trim commands.

11. The storage array controller of claim 9 wherein the storage array controller autonomously issues at least one of the one or more disk trim commands to at least one array block address that is not in the map.

12. The storage array controller of claim 9 wherein the storage array controller creates one or more old array block addresses; and wherein the storage array controller autonomously issues at least one of the one or more disk trim commands to at least one of the one or more old array block addresses.

13. The storage array controller of claim 9 wherein the storage array controller performs garbage collection.

14. The storage array controller of claim 9 wherein the storage array controller collects write commands into one or more superblocks; and wherein the storage array controller writes to one or more of the at least one solid-state disks using the one or more superblocks.

15. The storage array controller of claim 8 wherein the one or more disk trim commands are autonomously generated in a device driver.

16. The storage array controller of claim 15 wherein the device driver is part of the host system.

17. The storage array controller of claim 15 wherein the device driver is part of a hypervisor.

18. The storage array controller of claim 8 wherein the storage array has a first storage capacity; wherein a second storage capacity presented to the host system is less than the first storage capacity; wherein the first storage capacity minus the second storage capacity is a third storage capacity; and wherein the storage array controller autonomously issues the one or more disk trim commands directed to the third storage capacity in response to the one or more host commands.

19. The storage array controller of claim 8 wherein the storage array controller issues the one or more disk trim commands during an operation selected from the following: storage array initialization, storage array creation, storage array resizing, LUN creation, LUN removal, LUN resizing, LUN deletion.

20. A host computer system for storing and providing data; the host computer system comprising or operable to be coupled to a storage array controller; the storage array controller included in or operable to be coupled to a storage array; the storage array including a plurality of storage devices; the plurality of storage devices including at least one solid-state storage device; wherein the host computer system manages a first set of logical storage addresses; wherein the storage array controller manages a second set of logical storage addresses; wherein at least one of the at least one solid-state storage devices manages a set of physical storage addresses; wherein the first set of logical storage addresses comprises at least one set of host block addresses; wherein the second set of logical storage addresses comprises at least one set of array block addresses; wherein the first set of physical block addresses comprises at least one set of physical block numbers; wherein the storage array controller is operable to transmit at least one disk command to the storage array; wherein the host computer system further comprises one or more host file systems; wherein the host computer system manages the one or more host file systems; wherein the host computer system further comprises one or more host storage drivers; wherein the one or more host file systems are logically coupled to the one or more host storage drivers; wherein the one or more host storage drivers are logically coupled to the storage array controller; wherein the storage array is managed; wherein the storage array controller is operable to transmit one or more disk commands to the storage array; wherein the storage array controller is operable to receive one or more host commands from the host system; wherein the host commands comprise storage commands; wherein the host computer system further comprises at least one host operating system; wherein the one or more host commands are generated by at least one of the host computer operating systems; wherein the one or more host commands are directed to one or more solid-state storage devices in the storage array; wherein one or more solid-state storage devices in the storage array comprise one or more solid-state storage device controllers; and wherein the storage array controller is operable to autonomously issue the one or more disk commands to one or more of the at least one solid-state storage devices in response to the one or more host commands.

* * * * *